(12) United States Patent
Yonekubo et al.

(10) Patent No.: US 11,467,417 B2
(45) Date of Patent: Oct. 11, 2022

(54) DISPLAY DEVICE

(71) Applicant: SEIKO EPSON CORPORATION, Tokyo (JP)

(72) Inventors: Masatoshi Yonekubo, Suwa-gun (JP); Koya Shiratori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 212 days.

(21) Appl. No.: 16/828,175

(22) Filed: Mar. 24, 2020

(65) Prior Publication Data

US 2020/0310146 A1 Oct. 1, 2020

(30) Foreign Application Priority Data

Mar. 25, 2019 (JP) .............................. JP2019-056498

(51) Int. Cl.
*G02B 27/42* (2006.01)
*F21V 8/00* (2006.01)
*G02B 5/18* (2006.01)

(52) U.S. Cl.
CPC ....... *G02B 27/4205* (2013.01); *G02B 5/1861* (2013.01); *G02B 6/005* (2013.01); *G02B 6/0026* (2013.01)

(58) Field of Classification Search
CPC ............ G02B 27/4205; G02B 27/0172; G02B 5/1861; G02B 6/0026; G02B 6/005

USPC ........................................................ 359/566
See application file for complete search history.

(56) References Cited

U.S. PATENT DOCUMENTS

| 2003/0081156 | A1 | 5/2003 | Creemers et al. |
| 2017/0261751 | A1* | 9/2017 | Noguchi ........... G02B 27/0172 |
| 2019/0053696 | A1 | 2/2019 | Igarashi et al. |
| 2019/0219818 | A1* | 7/2019 | Mattinson ......... G02B 27/0172 |
| 2021/0270441 | A1* | 9/2021 | Vojtisek ................. G02B 5/32 |

FOREIGN PATENT DOCUMENTS

| JP | 2006-349719 A | 12/2006 |
| JP | 2009-157026 A | 7/2009 |
| JP | 2017-167181 A | 9/2017 |

* cited by examiner

*Primary Examiner* — Collin X Beatty
(74) *Attorney, Agent, or Firm* — Oliff PLC

(57) ABSTRACT

A display device according to the present disclosure includes an imaging light generating device configured to emit imaging light, a first diffraction element configured to diffract the imaging light emitted from the imaging light generating device, a second diffraction element configured to diffract the imaging light diffracted by the first diffraction element to form an exit pupil, and an optical filter disposed between the imaging light generating device and the exit pupil, and configured to attenuate a band on a short wavelength side of a peak wavelength of red light included in the imaging light emitted from the imaging light generating device.

8 Claims, 16 Drawing Sheets

DISPLAY DEVICE

The present application is based on, and claims priority from JP Application Serial Number 2019-056498, filed Mar. 25, 2019, the disclosure of which is hereby incorporated by reference herein in its entirety.

BACKGROUND

1. Technical Field

The present disclosure relates to a display device.

2. Related Art

As a display device including a diffraction element such as a holographic element, a display device has been proposed in which imaging light emitted from an imaging light generating device is deflected toward an eye of an observer by a diffraction element. Interference patterns are optimized in the diffraction element to obtain an optimum diffraction angle and optimum diffraction efficiency at a specific wavelength. However, the imaging light has a predetermined spectral width centered at a specific wavelength, and thus, light with a peripheral wavelength deviated from the specific wavelength may cause a decrease in resolution of an image. Thus, a display device has been proposed in which imaging light emitted from the imaging light generating device is emitted by a first diffraction element of the reflection type toward a second diffraction element disposed in front of the first diffraction element and in which the second diffraction element deflects, toward the eye of the observer, the imaging light emitted from the first diffraction element. According to the configuration, the first diffraction element can compensate for light having a peripheral wavelength and cancel a color aberration, and a decrease in resolution of an image due to the light having the peripheral wavelength deviated from a specific wavelength can be suppressed (for example, see JP-A-2017-167181 below).

In the display device described above, the imaging light diffracted by the second diffraction element is incident on the eye of the observer while light having the specific wavelength and light having the peripheral wavelength are separated from each other. Here, stimulus to a visual cell of the eye changes depending on a wavelength of the incident light, thus, for example, there was a possibility that, when a wavelength band of light incident on a pupil changes due to the eye of the observer moving, white balance of an image visible by the observer may deviate due to the change in stimulus experienced by the visual cell of the eye.

SUMMARY

In order to solve the above-described problem, a display device according to a first aspect of the present disclosure includes an imaging light generating device configured to emit imaging light, a first diffraction element configured to diffract the imaging light emitted from the imaging light generating device, a second diffraction element configured to diffract the imaging light diffracted by the first diffraction element to form an exit pupil, and an optical filter disposed between the imaging light generating device and the exit pupil, and configured to attenuate a band of red light on a side of a short wavelength that is shorter than a peak wavelength and included in the imaging light emitted from the imaging light generating device.

Additionally, a display device according to a second aspect of the present disclosure includes an imaging light generating device configured to emit imaging light, a first diffraction element configured to diffract the imaging light emitted from the imaging light generating device, a second diffraction element configured to diffract the imaging light diffracted by the first diffraction element to form an exit pupil, and an optical filter disposed between the imaging light generating device and the exit pupil, wherein when a wavelength, at which sensitivity of a visual cell of an eye for first color light included in the imaging light emitted from the imaging light generating device is maximized, is a first wavelength, and a peak wavelength of the first color light included in the imaging light is a second wavelength, the optical filter attenuates a band of the first color light on a side of a short wavelength that is shorter than the second wavelength when the first wavelength is shorter than the second wavelength, and attenuates a band of the first color light on a side of a long wavelength that is longer than the second wavelength when the first wavelength is longer than the second wavelength.

In the display device according to the aspect described above, the optical filter may provide a greater attenuation force as the wavelength of the red light becomes shorter.

In the display device according to the aspect described above, the optical filter may provide a greater attenuation force as a wavelength of the first color light becomes shorter when the first wavelength is shorter than the second wavelength, and may provide a greater attenuation force as the wavelength of the first color light may become longer when the first wavelength is longer than the second wavelength.

In the display device according to the aspect described above, the first color light may be the red light.

In the display device according to the aspect described above, the optical filter may be provided at a position on a light path of the imaging light through which the imaging light passes as a parallel luminous flux.

The image display device according the aspect described above may further include, along a light path of imaging light emitted from the imaging light generating device, a first optical unit having positive power, a second optical unit including the first diffraction element and having positive power, a third optical unit having positive power, and a fourth optical unit including the second diffraction element and having positive power.

The display device according to the aspect described above may further include a light guide on which the imaging light emitted from the first diffraction element is incident, and the second diffraction element may emit the imaging light propagating within the light guide.

DESCRIPTION OF EXEMPLARY EMBODIMENTS

First Exemplary Embodiment

Exemplary embodiments of the present disclosure will be described below with reference to the accompanying drawings. Note that, in each of the figures below, to illustrate each of layers or each of members at a recognizable size, a scale of each of the layers or each of the members is different from an actual scale and an actual angle.

Figure 1:
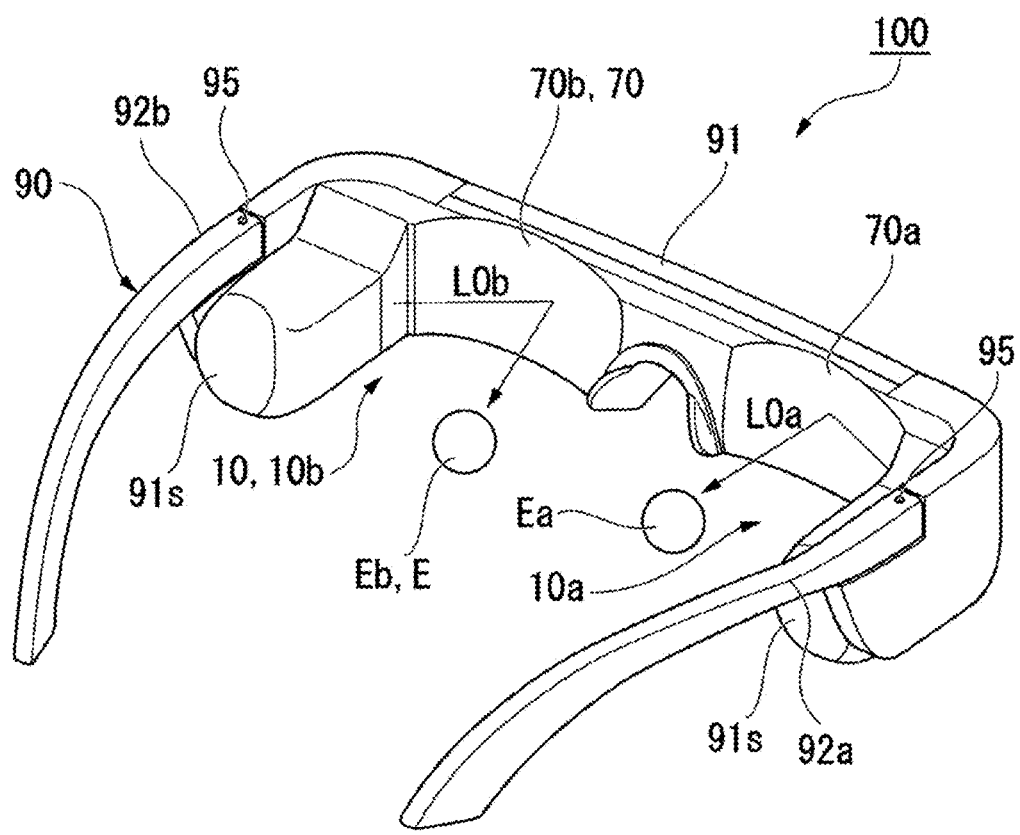
FIG. 1 is an external view of a display device according to a first exemplary embodiment.
Figure 1:
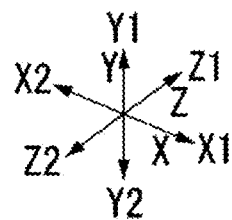
Figure 2:
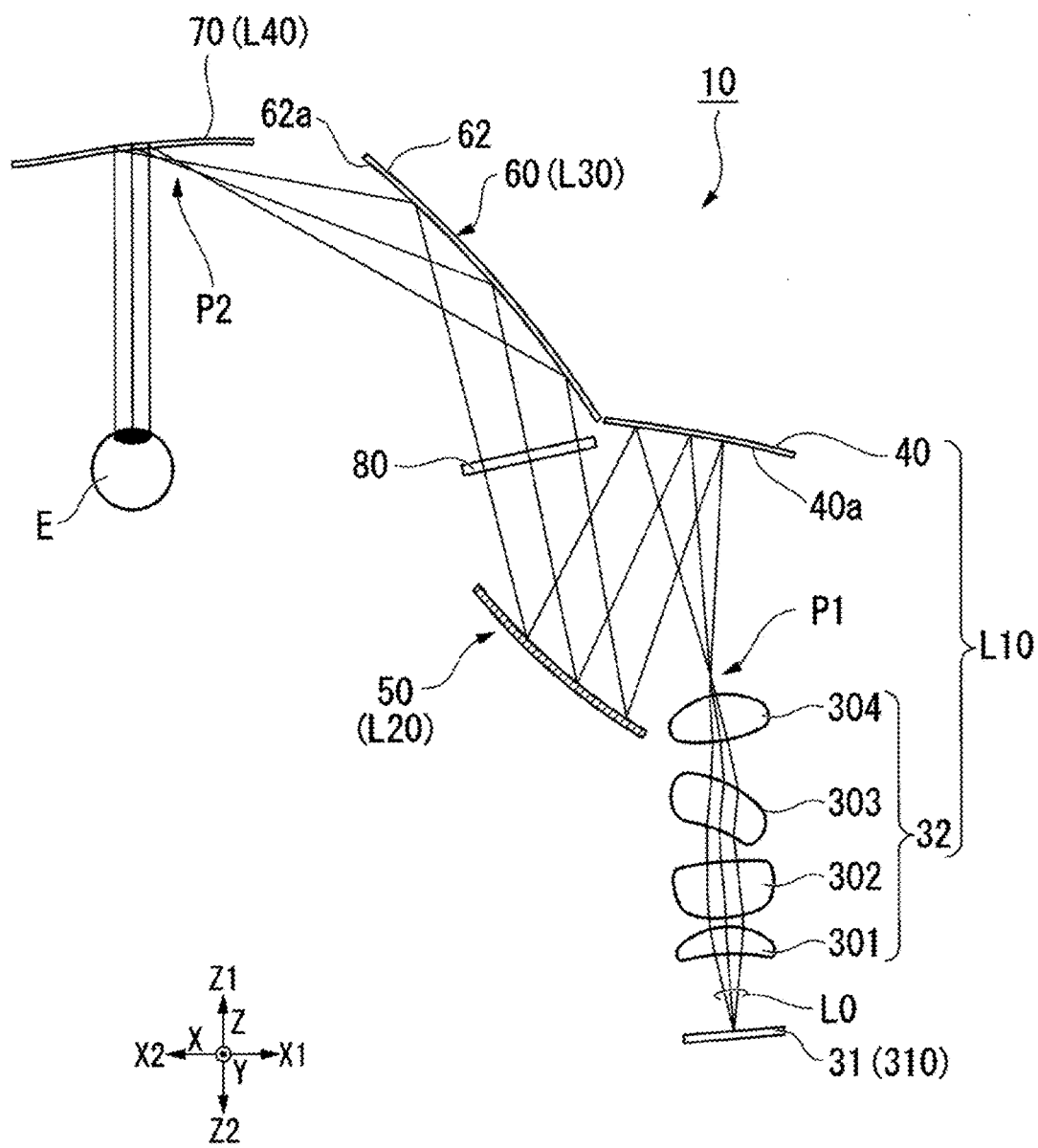
FIG. 2 is a schematic diagram of an optical system of the display device.

FIG. 1 is an external view illustrating an aspect of a visual appearance of a display device 100 according to the present exemplary embodiment. FIG. 2 is a schematic diagram illustrating one aspect of an optical system 10 of the display device 100 illustrated in FIG. 1. Note that, as necessary in the drawings used in the following description, a front-rear direction of an observer wearing the display device is a direction along a Z-axis, the front of the observer wearing the display device is a front side Z1 as one side in the front-rear direction, and the rear of the observer wearing the display device is a rear side Z2 as another side in the front-rear direction. A left and right direction with respect to the observer wearing the display device is defined as a direction along an X-axis, one side in the left and right direction corresponding to the right direction of the observer wearing the display device is defined as a right side X1, and another side in the left and right direction corresponding to the left direction of the observer wearing the display device is defined as a left side X2. An up and down direction with respect to the observer wearing the display device is defined as a direction along a Y-axis, one side in the up and down direction corresponding to the up direction of the observer wearing the display device is defined as an up side Y1, and another side in the left and right direction corresponding to the down direction of the observer wearing the display device is defined as a down side Y2.

The display device 100 illustrated in FIG. 1 is a head-mounted display device, and includes a right-eye optical system 10a that causes imaging light L0a to be incident on a right eye Ea and the left-eye optical system 10b that causes imaging light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted to the head of the observer by the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components such as an imaging light projecting device that constitute the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

Next, a basic configuration of the optical system 10 of the display device 100 will be described with reference to FIG. 2.

As illustrated in FIG. 2, in the optical system 10 in the present exemplary embodiment, a first optical unit L10 having positive power, a second optical unit L20 having positive power, a third optical unit L30 having positive power, a fourth optical unit L40 having positive power, and an optical filter 80 are disposed along a light path of imaging light L0 emitted from an imaging light generating device 31.

In the present exemplary embodiment, the first optical unit L10 having positive power is constituted of a mirror 40 and a projection optical system 32. The second optical unit L20 having the positive power includes a first diffraction element 50 of a reflection type. The third optical unit L30 having positive power is constituted of a light-guiding system 60. The fourth optical unit L40 having positive power is constituted of a second diffraction element 70 of a reflection type. In the present exemplary embodiment, the first diffraction element 50 and the second diffraction element 70 are reflection type diffraction elements.

In the optical system 10, with focus on a traveling direction of the imaging light L0, the imaging light generating device 31 emits the imaging light L0 toward the projection optical system 32, and the projection optical system 32 emits the incident imaging light L0 toward the mirror 40. The mirror 40 includes a reflection surface 40a and reflects the imaging light L0 toward the first diffraction element 50. The imaging light L0 reflected by the reflection surface 40a of the mirror 40 is incident on the first diffraction element 50. The imaging light L0 diffracted by the first diffraction element 50 is emitted toward the light-guiding system 60. The light-guiding system 60 emits the incident imaging light L0 toward the second diffraction element 70, and the second diffraction element 70 emits the incident imaging light L0 toward an eye E of the observer.

In the present exemplary embodiment, the imaging light generating device 31 generates the imaging light L0.

An aspect may be adopted where the imaging light generating device 31 includes a display panel 310 such as an organic electroluminescent display element. The aspect can provide a small-sized display device 100 capable of displaying a high-quality image. An aspect may be adopted where the imaging light generating device 31 includes an illumination light source (not illustrated) and the display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the imaging light L0. Herein, an aspect may be adopted where the imaging light generating device 31 includes one display panel 310 that enables color display. Another aspect may be adopted where the imaging light generating device 31 includes a plurality of the display panels 310 corresponding to respective colors and a synthesis optical system that synthesizes imaging light in respective colors emitted from the plurality of display panels 310. Furthermore, an aspect may be adopted where the imaging light generating device 31 modulates laser light using a micromirror device. In this case, imaging light is generated by scanning the laser light by driving the micromirror device.

The projection optical system 32 is an optical system that projects the imaging light L0 generated by the imaging light generating device 31, and is constituted of a first lens 301, a second lens 302, a third lens 303, and a fourth lens 304. The first lens 301, the second lens 302, the third lens 303, and the fourth lens 304 are constituted of a free-form lens or a rotationally symmetrical lens. The projection optical system 32 may be an eccentric optical system. In FIG. 2, an example is given of a case in which the number of lenses in the projection optical system 32 is four, but the number of lenses is not limited thereto. The projection optical system 32 may include five or more lenses. The lenses may be stuck together to form the projection optical system 32.

The light-guiding system 60 includes a mirror 62 with a reflection surface 62a that is more recessed at the center than at peripheral portions. The light-guiding system 60 has positive power. The mirror 62 includes the reflection surface 62a inclined obliquely in the front-rear direction. The reflection surface 62a includes a spherical surface, an aspherical surface, a free form surface, or the like. In the present exemplary embodiment, the mirror 62 is a total reflection mirror with the reflection surface 62a including a free form surface. However, the mirror 62 may be a half mirror, and in this case, the range in which outside light is visible can be widened.

Now, respective configurations of the second optical unit L20 including the first diffraction element 50, and the fourth optical unit L40 including the second diffraction element 70 will be described. In the present exemplary embodiment, the first diffraction element 50 and the second diffraction element 70 have the same basic configuration. Hereinafter, a configuration of the second diffraction element 70 will be described as an example.

Figure 3A:
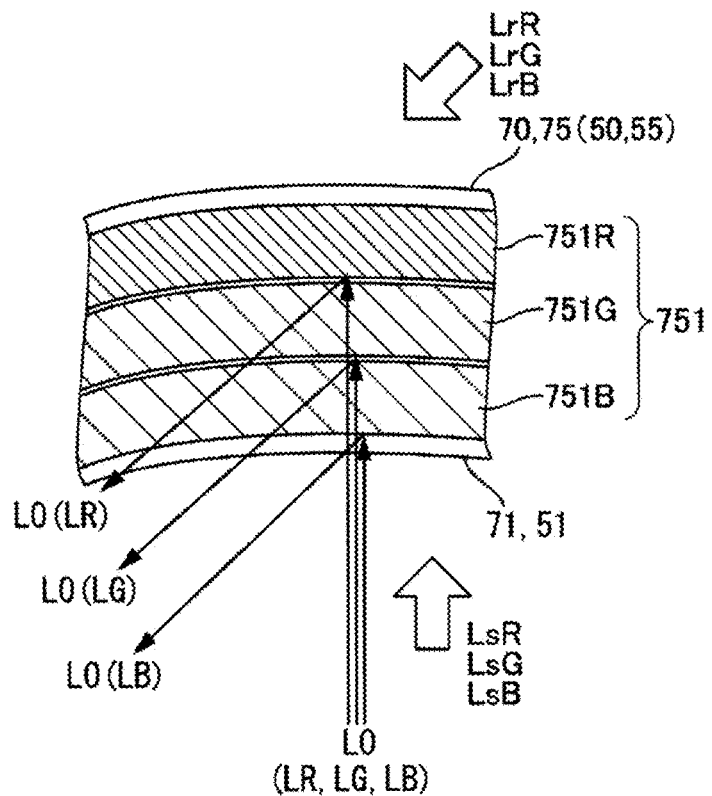
FIG. 3A is a schematic diagram of interference patterns of a diffraction element.

FIG. 3A is a schematic diagram of interference patterns 751 of the second diffraction element 70 illustrated in FIG. 2. As illustrated in FIG. 3A, the second diffraction element 70 is a partial reflection type diffraction optical element constituted by a reflection type volume hologram element. Thus, the second diffraction element 70 constitutes a partial transmissive reflective combiner. Therefore, outside light is also incident on the eye E via the second diffraction element 70, and thus the observer can recognize an image in which the imaging light L0 formed by the imaging light generating device 31 and the outside light (background) are superimposed on each other.

The second diffraction element 70 faces the eye E of the observer. An incident surface 71 of the second diffraction element 70 on which the imaging light L0 is incident has a concave surface being recessed in a direction away from the eye E. In other words, the incident surface 71 has a shape having a central portion recessed and curved with respect to a peripheral portion in the incident direction of the imaging light L0. Thus, the imaging light L0 can be efficiently condensed toward the eye E of the observer.

The second diffraction element 70 includes the interference patterns 751 with a pitch corresponding to a specific wavelength. The interference patterns 751 are recorded as a difference in refractive index and the like in a holographic photosensitive layer. The interference patterns 751 are inclined in one direction with respect to the incident surface 71 of the second diffraction element 70 so as to correspond to a specific incident angle. Therefore, the second diffraction element 70 diffracts and then deflects the imaging light L0 in a predetermined direction. The specific wavelength and the specific incident angle respectively correspond to a wavelength and an incident angle of the imaging light L0. The interference patterns 751 having the configuration can be formed by performing interference exposure on the holographic photosensitive layer by using reference light Lr and object light Ls.

In the present exemplary embodiment, the imaging light L0 is used for color display, and thus includes red light LR, green light LG, and blue light LB. Thus, the second diffraction element 70 includes interference patterns 751R, 751G, and 751B having a pitch corresponding to the specific wavelength. For example, the interference patterns 751R are formed, for example, at a pitch corresponding to the red light LR with a wavelength of 615 nm included in a wavelength range from 580 nm to 700 nm. The interference patterns 751G are formed, for example, at a pitch corresponding to the green light LG with a wavelength of 535 nm included in a wavelength range from 500 nm to 580 nm. The interference patterns 751B are formed, for example, at a pitch corresponding to the blue light LB with a wavelength of 460 nm, for example, in a wavelength range from 400 nm to 500 nm. The configuration can be formed by forming a holographic photosensitive layer having sensitivity corresponding to the respective wavelengths, and performing double beam interference exposure on the holographic photosensitive layer by using reference light LrR, LrG, and LrB and object light LsR, LsG, and LsB having the respective wavelengths.

Figure 3B:
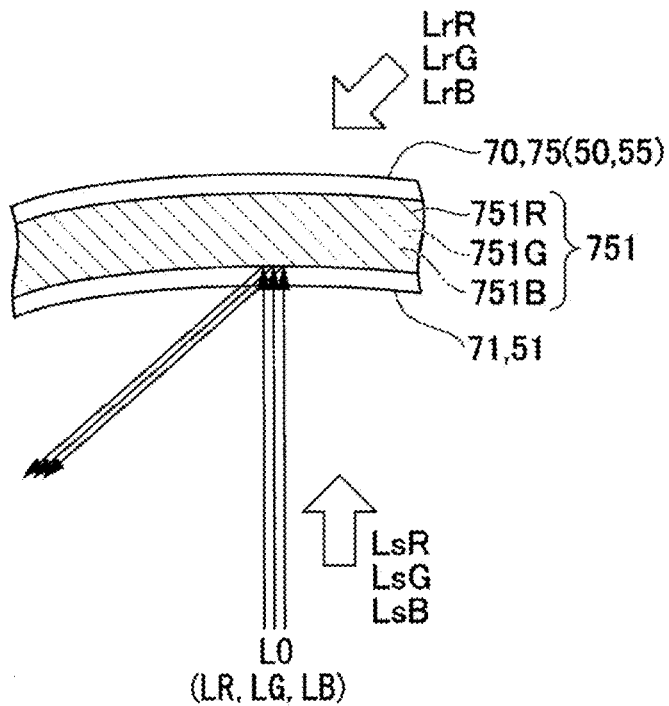
FIG. 3B is a schematic diagram of a different exemplary embodiment of interference patterns of a diffraction element.

Note that, as illustrated in FIG. 3B, the interference patterns 751 in which the interference patterns 751R, 751G, and 751B are superimposed on each other in one layer may be formed by dispersing a photosensitive material having sensitivity corresponding to the respective wavelengths in the holographic photosensitive layer, and then performing interference exposure on the holographic photosensitive layer by using the reference light LrR, LrG, and LrB and the object light LsR, LsG, and LsB having the respective wavelengths. Further, light having a spherical wave may be used as the reference light LrR, LrG, and LrB and the object light LsR, LsG, and LsB.

The first diffraction element 50 with the same basic configuration as the second diffraction element 70 is provided with a reflection type volume holographic element 55. An incident surface 51 of the first diffraction element 50 on which the imaging light L0 is incident has a concave surface being recessed. In other words, the incident surface 51 has a shape having a central portion recessed and curved with respect to a peripheral portion in the incident direction of the imaging light L0. Thus, the imaging light L0 can be efficiently deflected toward the light-guiding system 60.

Figure 4:
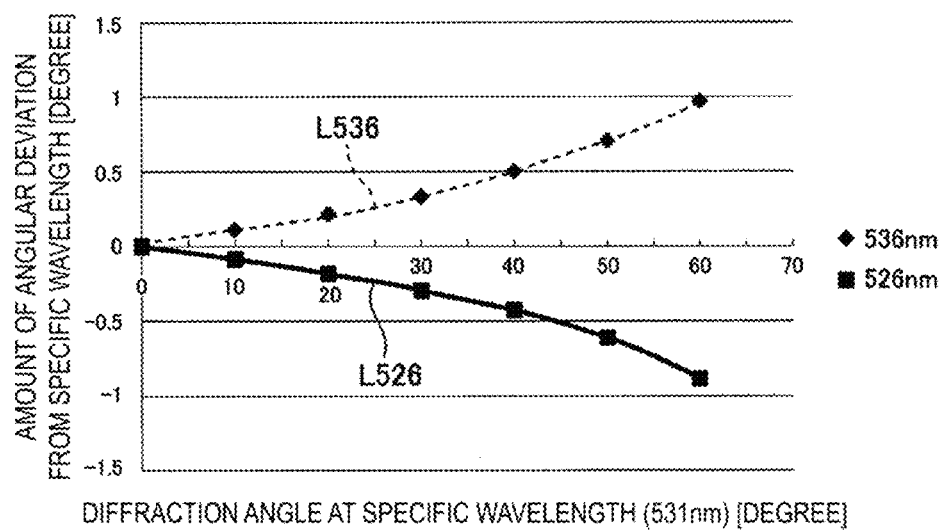
FIG. 4 is a diagram describing a diffraction characteristic in a volume hologram.

FIG. 4 is a diagram illustrating a diffraction characteristic in a volume hologram constituting the first diffraction element 50 and the second diffraction element 70. FIG. 4 illustrates a difference in diffraction angle between a specific wavelength and a peripheral wavelength when a light beam is incident on one point on the volume hologram. In FIG. 4, when assuming that the specific wavelength is 531 nm, a deviation in diffraction angle of light at a peripheral wavelength of 526 nm is indicated by a solid line L526, and a deviation in diffraction angle of light at a peripheral wavelength of 536 nm is indicated by a dashed line L536. As illustrated in FIG. 4, even when a light beam is incident on the same interference patterns recorded in the hologram, a light beam having a longer wavelength diffracts more greatly, and a light beam having a shorter wavelength is less likely to diffract. Thus, when two diffraction elements, namely, the first diffraction element 50 and the second diffraction element 70 are used as in the present exemplary embodiment, proper wavelength compensation fails to be achieved unless considerations are given for the ray angle of incident light with a wavelength larger or smaller than the specific wavelength. In other words, color aberration occurring in the second diffraction element 70 fails to be canceled.

In the optical system 10 illustrated in FIG. 2, as described in JP-A-2017-167181, wavelength compensation, namely, a color aberration can be canceled because an incident direction and the like to the second diffraction element 70 is made appropriate in accordance with whether a sum of the number of times of formation of an intermediate image between the first diffraction element 50 and the second diffraction element 70 and the number of times of reflection by the mirror 62 is odd or even.

Figure 5:
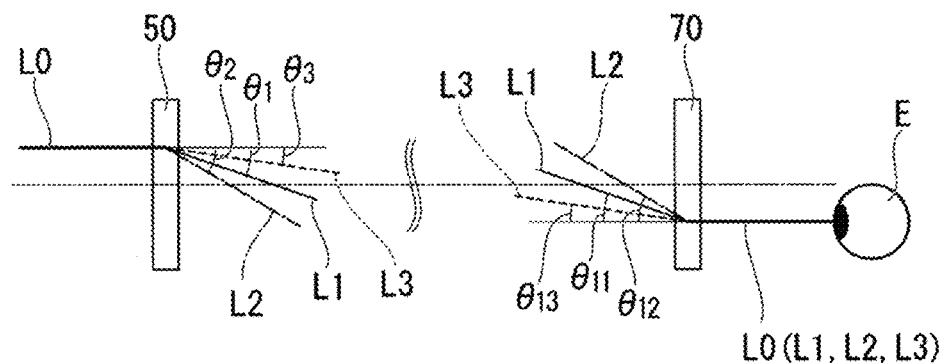
FIG. 5 is a schematic diagram of a principle of cancellation of color aberration occurring at a second diffraction element.

FIG. 5 is a diagram illustrating a principle of cancellation of a color aberration occurring in the second diffraction element 70. Note that FIG. 5 also illustrates, in addition to light L1 (solid line) with the specific wavelength of the imaging light L0, light L2 (dot-and-dash line) on a long wavelength side and light L3 (dashed line) on a short wavelength side with respect to the specific wavelength.

Specifically, the imaging light L0 incident on the first diffraction element 50 is deflected by being diffracted by the first diffraction element 50 as illustrated in FIG. 5. At this time, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than a diffraction angle $\theta_1$ of the light L1 with the specific wavelength. Therefore, the imaging light L0 emitted from the first diffraction element 50 is deflected and dispersed at each wavelength.

The imaging light L0 emitted from the first diffraction element 50 is incident on the second diffraction element 70 via the light-guiding system 60 and is then diffracted and deflected by the second diffraction element 70. At this time, on the light path from the first diffraction element 50 to the second diffraction element 70, an intermediate image is formed once, and reflection by the mirror 62 is performed once. Therefore, when the incident angle is defined as an angle between the imaging light L0 and a normal line of an incident surface of the second diffraction element 70, the light L2 on the long wavelength side with respect to the specific wavelength has an incident angle $\theta_{12}$ larger than the incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. As described above, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a larger incident angle than the light L1 with the specific wavelength. However, the light L2 on the long wavelength side with respect to the specific wavelength has a larger diffraction angle than the light L1 with the specific wavelength, and as a result, the light L2 on the long wavelength side with respect to the specific wavelength and the light L1 with the specific wavelength are substantially parallel when being emitted from the second diffraction element 70. In contrast, the light L3 on the short wavelength side with respect to the specific wavelength is incident on the first diffraction element 50 at a smaller incident angle than the light L1 with the specific wavelength. However, the light L3 on the short wavelength side with respect to the specific wavelength has a smaller diffraction angle than the light L1 with the specific wavelength, and as a result, the light L3 on the short wavelength side with respect to the specific wavelength and the light L1 with the specific wavelength are substantially parallel when being emitted from the second diffraction element 70. Thus, a position shift of image formation in a retina E0 at each wavelength can be suppressed.

Now, a conjugate relationship between the first diffraction element 50 and the second diffraction element 70 will be described.

Figure 6A:
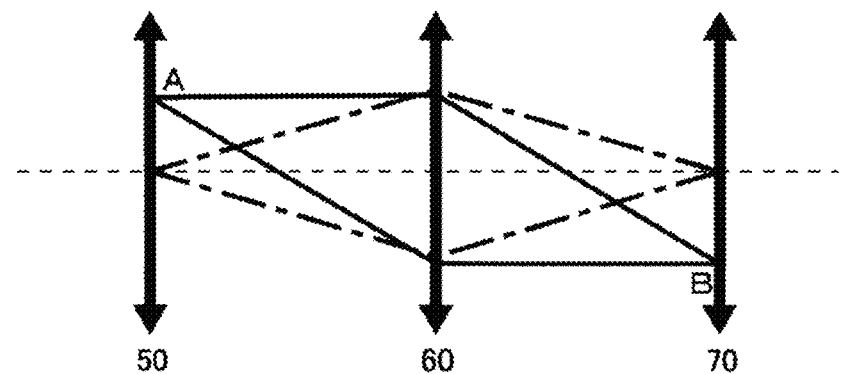
FIG. 6A is a schematic diagram of a case in which a first diffraction element and the second diffraction element have a conjugate relationship.
Figure 6B:
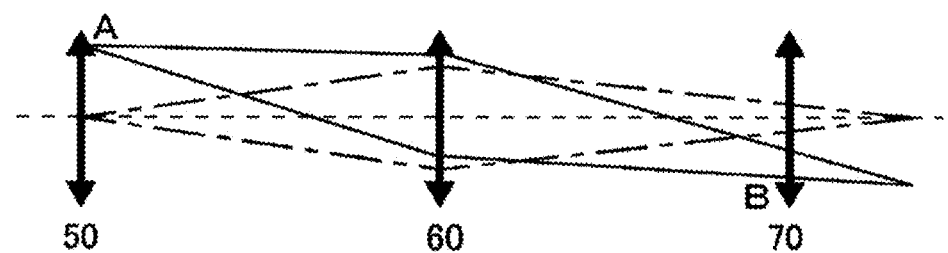
FIG. 6B is a schematic diagram of a case in which the first diffraction element and the second diffraction element do not have a conjugate relationship.
Figure 6C:
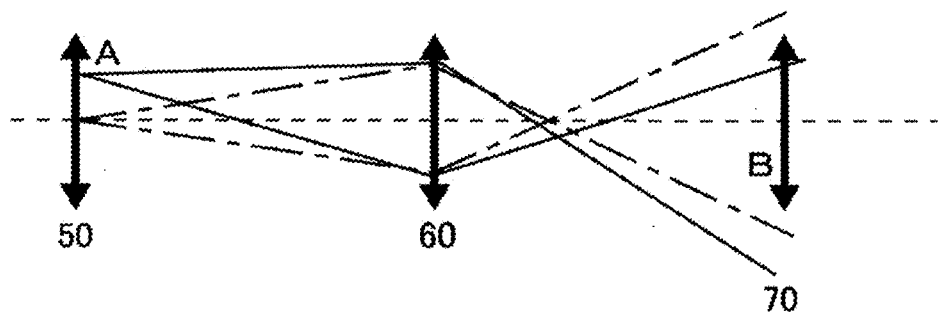
FIG. 6C is a schematic diagram of a case in which the first diffraction element and the second diffraction element do not have a conjugate relationship.
Figure 7A:
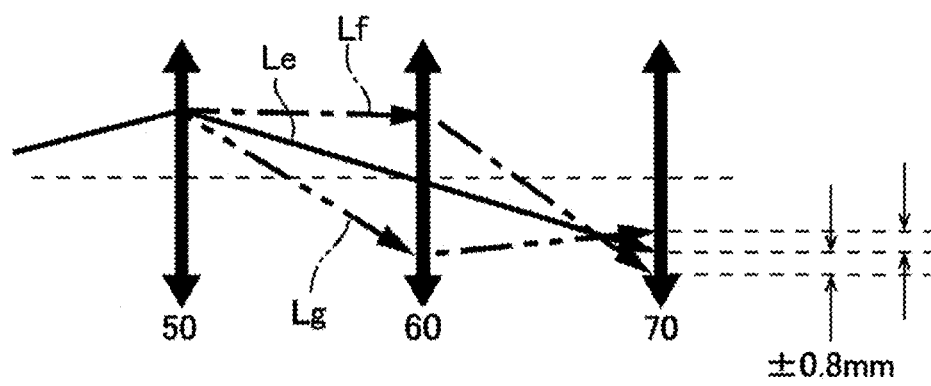
FIG. 7A is a schematic diagram illustrating a tolerance of deviation from a conjugate relationship.
Figure 7B:
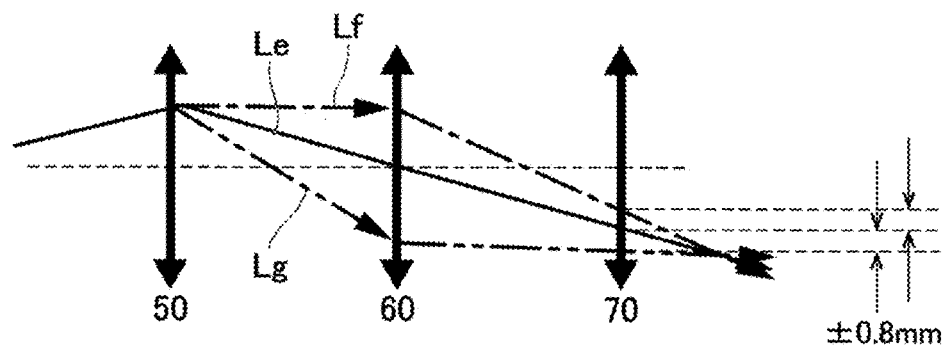
FIG. 7B is a schematic diagram illustrating a tolerance of deviation from a conjugate relationship.

FIG. 6A is a schematic diagram of a case in which the first diffraction element 50 and the second diffraction element 70 are in the conjugate relationship. FIGS. 6B and 6C are schematic diagrams of a case in which the first diffraction element 50 and the second diffraction element 70 are not in the conjugate relationship. FIGS. 7A and 7B are schematic diagrams illustrating a tolerances for a deviation from the conjugate relationship between the first diffraction element 50 and the second diffraction element 70 illustrated in FIGS. 6B and 6C. In FIG. 7A and FIG. 7B, light with a specific wavelength is indicated by a solid line Le, light with a specific wavelength −10 nm is indicated by a dot-and-dash line Lf, and light with a specific wavelength +10 nm is indicated by a two-dot chain line Lg. Note that, in FIGS. 6A to 6C, FIG. 7A, and FIG. 7B, for facilitation of understanding of light traveling, the first diffraction element 50, the second diffraction element 70, and the light-guiding system 60 are illustrated as a transmissive-type and indicated by arrows.

As illustrated in FIG. 6A, when the first diffraction element 50 and the second diffraction element 70 are in the conjugate relationship, divergent light rays emitted from a point A (first position) of the first diffraction element 50 are collected by the light-guiding system 60 (lens) having positive power, and are incident at a point B (second position corresponding to the first position) of the second diffraction element 70. Therefore, color aberration caused by diffraction occurring at the point B can be compensated for at the point A.

In contrast, as illustrated in FIG. 6B and FIG. 6C, when the first diffraction element 50 and the second diffraction element 70 are not in the conjugate relationship, divergent light rays emitted from the point A of the first diffraction element 50 are collected by the light-guiding system 60, centrally located and having positive power, but intersect with each other and are incident at a position farther from the point B on the second diffraction element 70 or at a point between the first diffraction element 50 and the point B. Thus, the point A and the point B are not in a one-to-one relationship. Here, since a compensation effect increases when interference patterns are uniform within a region, the compensation effect decreases when the first diffraction element 50 and the second diffraction element 70 are not in the conjugate relationship. On the other hand, it is difficult to compensate for the entire projection region of the second diffraction element 70 by the first diffraction element 50. Therefore, in the aspects illustrated in FIG. 6B and FIG. 6C, sufficient wavelength compensation fails to be achieved, leading to a reduced resolution.

Note that there is an error of about ±0.4 mm from the point B that the light having the specific wavelength reaches in the light having the wavelength of ±10 nm with respect to the specific wavelength, but a decrease in resolution is not noticeable. Results of examination of such a permissible range indicate that, as illustrated in FIG. 7A, a decrease in resolution is unnoticeable when light rays with the specific wavelength intersect with each other at a point between the first diffraction element 50 and the point B on the second diffraction element 70, corresponding to the ideal point at which the light with the specific wavelength arrives, and are incident in a range of ±0.8 mm from the point B. As illustrated in FIG. 7B, a decrease in resolution is unnoticeable when light of a specific wavelength is incident in a range of ±0.8 mm that intersects with the B point on the ideal second diffraction element 70 where light of a specific wavelength reaches. Therefore, even when the first diffraction element 50 and the second diffraction element 70 are not in the perfect conjugate relationship, a decrease in resolution is permissible when the first diffraction element 50 and the second diffraction element 70 are in a substantially conjugate relationship and the light rays arrive within the range of ±0.8 mm from the ideal point B. In other words, in the present exemplary embodiment, the substantially conjugate relationship between the first diffraction element 50 and the second diffraction element 70 means that the incident position of light with the specific wavelength has an error range of ±0.8 mm from the ideal incident point.

Figure 8:
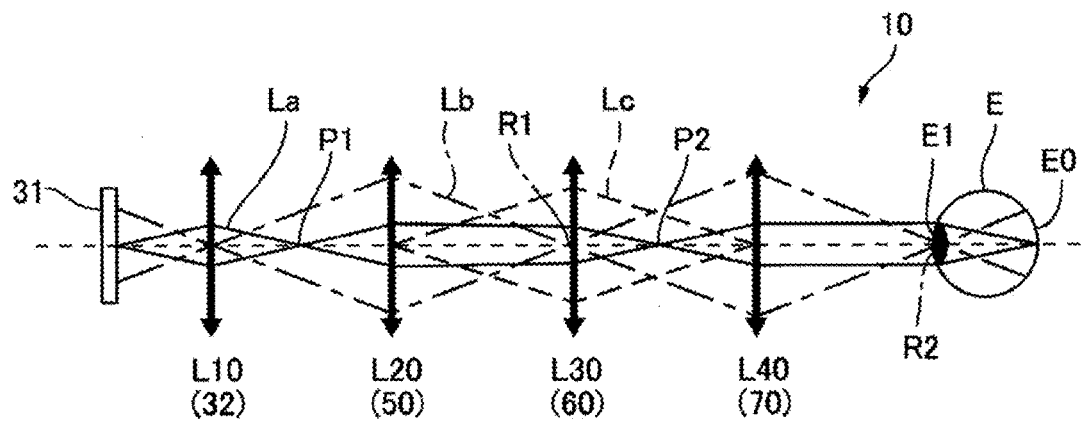
FIG. 8 is a light beam diagram in an optical system.

FIG. 8 is a light beam diagram of the optical system 10 in the present exemplary embodiment. In FIG. 8 and the figures referred to below, each of the optical units disposed along the optical axis is indicated by a thick arrow. Further, a light beam emitted from one pixel of the imaging light generating device 31 is indicated by a solid line La, a main light beam emitted from an end portion of the imaging light generating device 31 is indicated by a dot-and-dash line Lb, and a position in which the light beam is in a substantially conjugate relationship with the first diffraction element 50 is indicated by a long dashed line Lc. Here, "intermediate image" refers to a position where light beams (solid lines La) emitted from one pixel converge, and "pupil" refers to a position where the main light beams (dot-and-dash lines Lb) of angles of view converge. FIG. 8 also illustrates advance of the light emitted from the imaging light generating device 31. Note that, in FIG. 8, all optical units are illustrated as the transmissive-type for simplification of the figure.

As illustrated in FIG. 8, the optical system 10 of the present exemplary embodiment includes a first optical unit L10, a second optical unit L20, a third optical unit L30, and a fourth optical unit L40 provided along an light path of imaging light emitted from the imaging light generating device 31, the first optical unit L10 has positive power, the second optical unit L20 includes the first diffraction element 50 and has positive power, the third optical unit L30 has positive power, and the fourth optical unit L40 includes the second diffraction element 70 and has positive power.

A focal length of the first optical unit L10 is L/2. Focal lengths of the second optical unit L20, the third optical unit L30, and the fourth optical unit L40 are all L. Therefore, an optical distance from the second optical unit L20 to the third optical unit L30 is equal to an optical distance from the third optical unit L30 to the fourth optical unit L40.

In such an optical system 10, a first intermediate image P1 of imaging light is formed between the first optical unit L10 and the third optical unit L30, a pupil R1 is formed between the second optical unit L20 and the fourth optical unit L40, a second intermediate image P2 of imaging light is formed between the third optical unit L30 and the fourth optical unit L40, and the fourth optical unit L40 collimates the imaging light to form an exit pupil R2. At this time, the third optical unit L30 freely controllably converts the imaging light emitted from the second optical unit L20 into divergent light, convergent light, or parallel light, which is then caused to enter the fourth optical unit L40. The second optical unit L20 causes the imaging light emitted from the first optical unit L10 to be incident as convergent light on the third optical unit L30. In the optical system 10 of the present exemplary embodiment, the pupil R1 is formed between the second optical unit L2 and the fourth optical unit L40 and in the vicinity of the third optical unit L30. The vicinity of the third optical unit L30 refers to a position between the second optical unit L20 and the third optical unit L30 that is closer to the third optical unit L30 than to the second optical unit L20, or between the third optical unit L30 and the fourth optical unit L40, which is closer to the third optical unit L30 than to the fourth optical unit L40.

For the imaging light from one point of the imaging light generating device 31, the third optical unit L30 causes light with a peripheral wavelength deviated from the specific wavelength due to deflection by the first diffraction element 50 to enter a predetermined range of the second diffraction element 70. In other words, the first diffraction element 50 and the second diffraction element 70 are in a substantially conjugate relationship. Here, the absolute value of magnification of projection on the second diffraction element 70 by the third optical unit L30 of the first diffraction element 50 ranges from 0.5 times to 10 times, and the absolute value of such magnification may range from 1 time to 5 times.

Thus, according to the optical system 10 of the present exemplary embodiment, the first intermediate image P1 of the imaging light is formed between the projection optical system 32 and the light-guiding system 60, the pupil R1 is formed in the vicinity of the light-guiding system 60, the second intermediate image P2 of the imaging light is formed between the light-guiding system 60 and the second diffraction element 70, and the second diffraction element 70 collimates the imaging light to form the exit pupil R2.

In the optical system 10 in the present exemplary embodiment, the first intermediate image P1 is formed between the first optical unit L10 (projection optical system 32) and the second optical unit L20 (first diffraction element 50).

According to the optical system 10 of the present exemplary embodiment, four conditions (conditions 1, 2, 3, and 4) described below can be satisfied.

Condition 1: A light beam emitted from one point of the imaging light generating device 31 forms an image as one point in the retina E0.

Condition 2: An incident pupil of the optical system and a pupil of an eye are conjugated.

Condition 3: the first diffraction element 50 and the second diffraction element 70 are appropriately disposed so as to compensate for peripheral wavelengths.

Condition 4: The first diffraction element 50 and the second diffraction element 70 are in a substantially conjugate relationship.

More specifically, as can be understood from the solid line La illustrated in FIG. 8, Condition 1, where light beams emitted from one point of the imaging light generating device 31 form an image as one point on the retina E0, is satisfied. Consequently, an observer can visually recognize one pixel. As can be understood from the solid line La illustrated in FIG. 8, Condition 2, where an incident pupil of the optical system 10 and a pupil E1 of an eye E are in a conjugate relationship (conjugate relationship of pupils), is satisfied. Consequently, the entire image generated by the imaging light generating device 31 can be visually recognized. Condition 3, where the first diffraction element 50 and the second diffraction element 70 are properly arranged so as to compensate for a peripheral wavelength, is satisfied. Consequently, color aberration occurring in the second diffraction element 70 can be canceled by performing wavelength compensation. Further, as clearly seen from the long dashed line Lc illustrated in FIG. 8, Condition 4 that the first diffraction element 50 and the second diffraction element 70 are in a substantially conjugated relationship is satisfied. Thus, a light beam can be incident on a place having the same interference patterns in the first diffraction element 50 and the second diffraction element 70, and wavelength compensation can be appropriately performed. As described above, degradation of resolution of an image can be suppressed.

Incidentally, as described above, in the optical system 10 of the present exemplary embodiment, the substantially conjugate relationship is established between the first diffraction element 50 and the second diffraction element 70.

Figure 9:
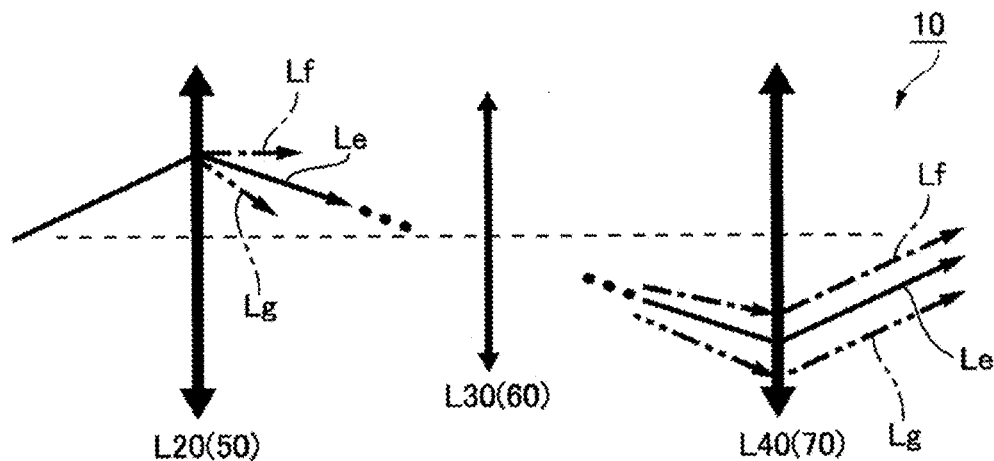
FIG. 9 is a schematic diagram of a case in which the first diffraction element and the second diffraction element have a substantially conjugate relationship.
Figure 10:
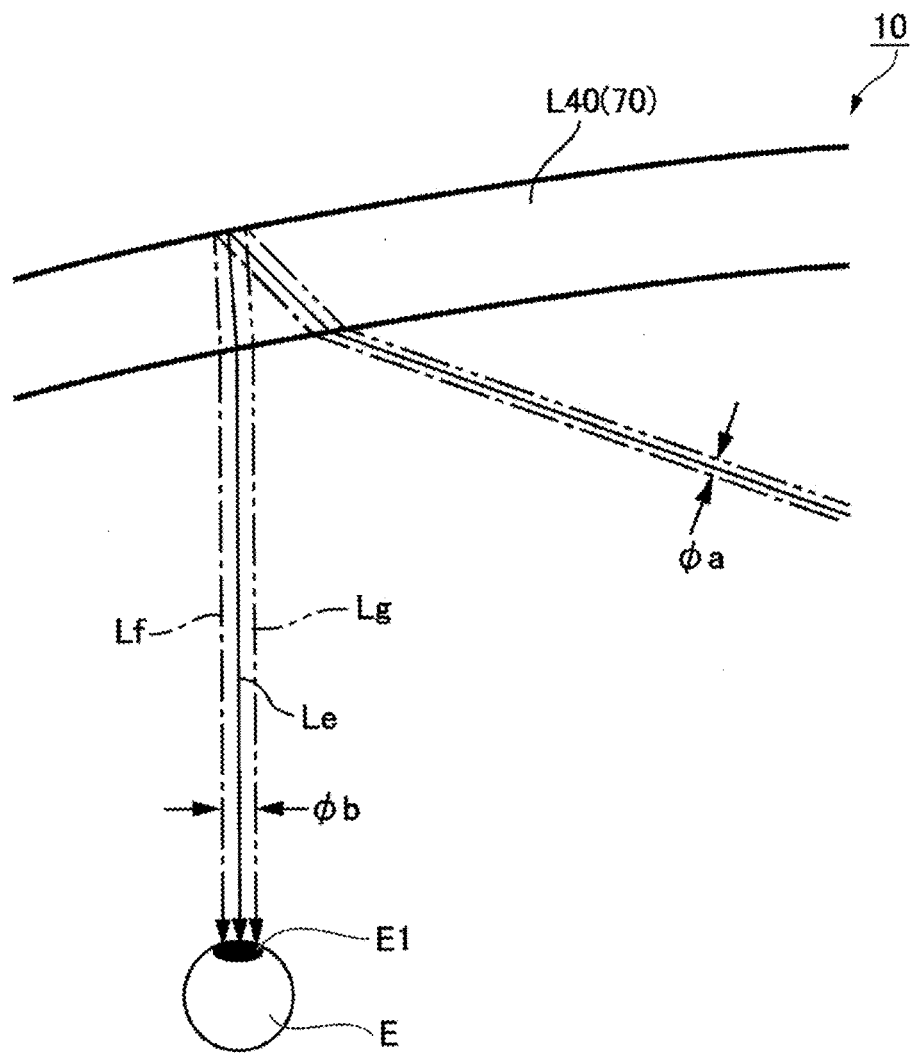
FIG. 10 is a schematic diagram of light emitted from the second diffraction element in a substantially conjugate relationship.
Figure 11:
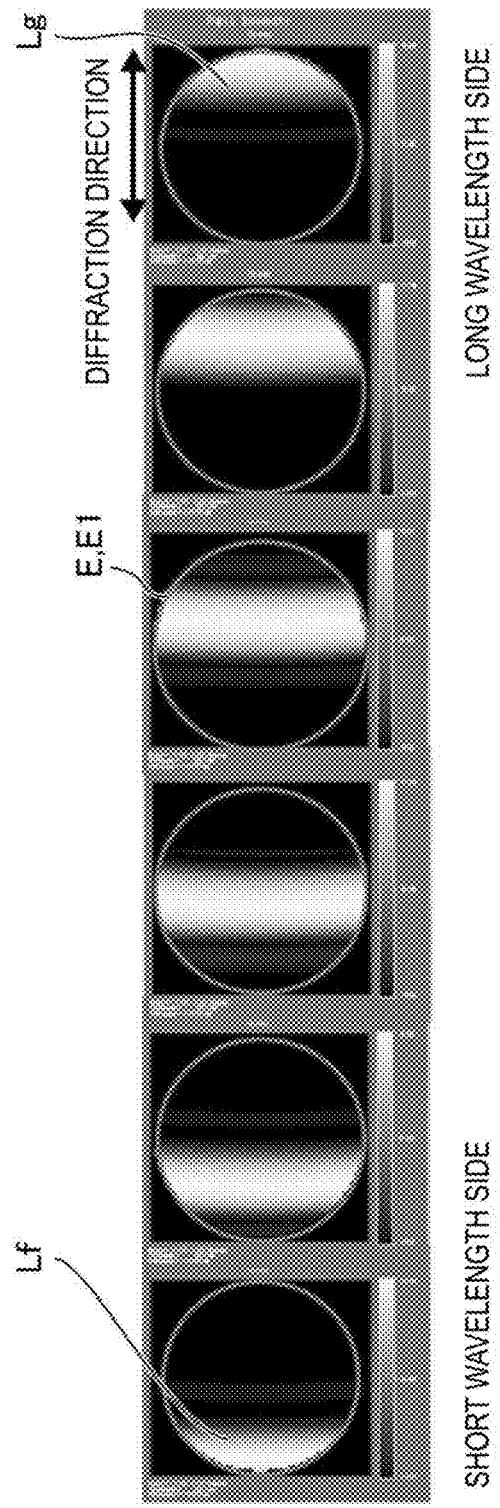
FIG. 11 is a schematic diagram illustrating a manner in which light is incident on an eye.

FIG. 9 is a schematic diagram of a case in which the first diffraction element 50 and the second diffraction element 70 have the substantially conjugate relationship. FIG. 10 is a schematic diagram of light emitted from the second diffraction element 70 when the substantially conjugate relationship illustrated in FIG. 9 is satisfied. FIG. 11 is a schematic diagram illustrating a state in which the light illustrated in FIG. 10 is incident on the eye E. Note that, in FIG. 9, light having a specific wavelength included in the imaging light L0 is indicated by a solid line Le, light on a short wavelength side having a specific wavelength of −10 nm is indicated by a dot-and-dash line Lf, and light on a long wavelength side having a specific wavelength of +10 nm is indicated by a two-dot chain line Lg. FIG. 11 illustrates a state in which the light on the short wavelength side having the specific wavelength of −10 nm (light indicated by the dot-and-dash line Lf in FIG. 10) is incident on the eye E on the farthest left side toward the drawing. FIG. 11 illustrates a state in which the light on the long wavelength side having the specific wavelength of +10 nm (light indicated by the two-dot chain line Lg in FIG. 10) is incident on the eye E on the farthest right side toward the drawing. FIG. 11 illustrates a state in which light having a wavelength changed from the specific wavelength of −10 nm to the specific wavelength of +10 nm is incident on the eye E between the farthest left side and the farthest right side. Note that, while light of the specific wavelength incident on the eye E is not illustrated in FIG. 11, light of the specific wavelength incident on the eye E is an intermediate state between the state illustrated third from the left and the state illustrated fourth from the left.

In an optical system 10 of the present exemplary embodiment, when the first diffraction element 50 and the second diffraction element 70 are in a substantially conjugate relationship, as illustrated in FIG. 9, the state of incidence on the second diffraction element 70 is different for light of peripheral wavelengths that deviate from the specific wavelength. Here, in the second diffraction element 70, as closer to an optical axis, the number of interference patterns is further reduced, and power of bending light is lower. Therefore, when light in a long wavelength side is caused to enter a side close to an optical axis and light in a short wavelength side is caused to enter a side close to an end, light in a specific wavelength and light in a peripheral wavelength are collimated. Consequently, an effect similar to wavelength compensation can be achieved.

In this case, because the light beam position deviates according to wavelength, as illustrated in FIG. 10, the diameter of the light beam incident on the pupil increases from a diameter pa to a diameter pb. FIG. 11 illustrates a state of light beam intensity incident on the pupil at that time. As clearly seen from FIG. 11, the pupil cannot be filled in the vicinity of the specific wavelength, but the light having the peripheral wavelength can fill the pupil diameter since the light having the peripheral wavelength is incident on a position deviated from that of the light having the specific wavelength. As a result, an observer has an advantage in that the observer can more easily see an image, for example.

As illustrated in FIG. 10, the imaging light emitted from the second diffraction element 70 is incident on the eye E of the observer, in a state in which the light Le having the specific wavelength, the light Lg on the long wavelength side, and the light Lf on the short wavelength side are separated from each other and are substantially parallel. In this manner, an incident position of the imaging light L0 with respect to the pupil E1 varies for each wavelength band. Thus, for example, when the eye E of the observer deviates in the left and right direction, there is a possibility that the wavelength band of the imaging light L0 incident on the pupil E1 of the eye E changes, and color balance (white balance) of an image visible by the observer changes.

The optical system 10 of the present exemplary embodiment is provided with the optical filter 80 (see FIG. 2) between the imaging light generating device 31 and the second diffraction element 70, thereby suppressing the change in the color balance described above. Hereinafter, a configuration of the optical filter 80 and an effect thereof will be described.

Figure 12:
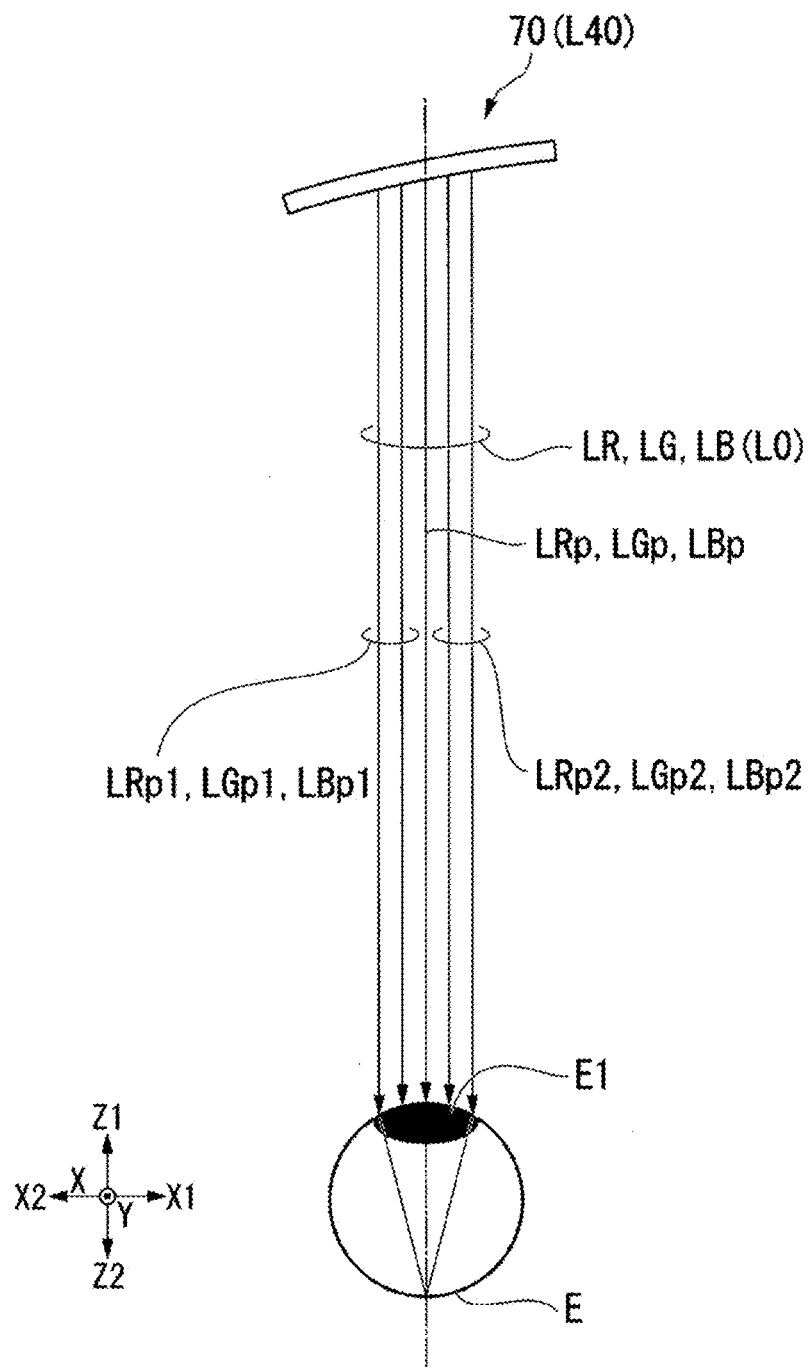
FIG. 12 is a diagram illustrating an incident state of imaging light on an eye of an observer.

FIG. 12 is a diagram illustrating an incident state of imaging light on an eye of an observer. The optical system 10 illustrated in FIG. 12 is a right-eye optical system that guides imaging light to a right eye of the observer. Thus, in FIG. 12, a nose is positioned on the left side X2 of the eye E, and an ear is positioned on the right side X1 of the eye E of the observer. Hereinafter, the left side X2 of the eye E is referred to as a "nasal side", and the right side X1 of the eye E is referred to as an "ear side".

As illustrated in FIG. 12, the optical system 10 of the present exemplary embodiment is designed such that, for each of the red light LR, the green light LG, and the blue light LB included in the imaging light L0, light in a peak wavelength band passes through a center of the pupil E1. For example, for the red light LR, a short wavelength component LRp1, which is light on a short wavelength side of a peak wavelength component LRp passes through the nasal side within the pupil E1, and a long wavelength component LRp2, which is light on a long wavelength side of a peak wavelength component LRp passes through the ear side within the pupil E1. Thus, the red light LR passes through different locations of the pupil E1 for respective wavelength bands.

Note that, the same as the red light LR applies to the green light LG and blue light LB included in the imaging light L0. That is, for the green light LG, a short wavelength component LGp1, which is light on a short wavelength side of a peak wavelength component LGp passes through the nasal side within the pupil E1, and a long wavelength component LGp2, which is light on a long wavelength side of a peak wavelength component LGp passes through the ear side within the pupil E1. Further, for the blue light LB, a short wavelength component LBp1, which is light on a short wavelength side of a peak wavelength component LBp passes through the nasal side within the pupil E1, and a long wavelength component LBp2, which is light on a long wavelength side of a peak wavelength component LBp passes through the ear side within the pupil E1.

In the above description, the right-eye optical system that guides the imaging light to the right eye of the observer is used as an example, but the same applies to a left-eye optical system. In the left-eye optical system, a positional relationship of the nose and the ear with respect to the eye E of the observer is reversed compared to the positional relationship in the right-eye optical system. Imaging light passing through the left-eye optical system has a light path obtained by inverting imaging light passing through the right-eye optical system in the right and left direction. Thus, the left-eye optical system is also designed such that, for each color light included in the imaging light L0 (red light LR, green light LG, and blue light LB), a short wavelength component passes through the nasal side within the pupil E1 and a long wavelength component passes through the ear side within the pupil E1.

It is known that stimulus of light to a visual cell of a human eye depends on wavelength. The visual cell of the eye includes a red visual cell corresponding to light in a red wavelength band on a long wavelength side of light included in imaging light, a green visual cell corresponding to light in a green wavelength band on a medium wavelength side, and a blue visual cell corresponding to light in a blue wavelength band on a short wavelength side.

The present inventors focused on correlation among visual sensitivity corresponding to a degree of excitement of the visual cell in the human eye and the tristimulus values XYZ. The present inventors then obtained knowledge that red visual sensitivity can be defined, which is a degree of excitement of the red visual cell by stimulus of light in the red wavelength band based on the stimulus value X of the tristimulus values XYZ, green visual sensitivity can be defined, which is a degree of excitement of the green visual cell by stimulus of light in the green wavelength band based on the stimulus value Y of the tristimulus values XYZ, and blue visual sensitivity can be defined, which is a degree of excitement of the blue visual cell by stimulus of light in the blue wavelength band based on the stimulus value Z of the tristimulus value XYZ.

Figure 13:
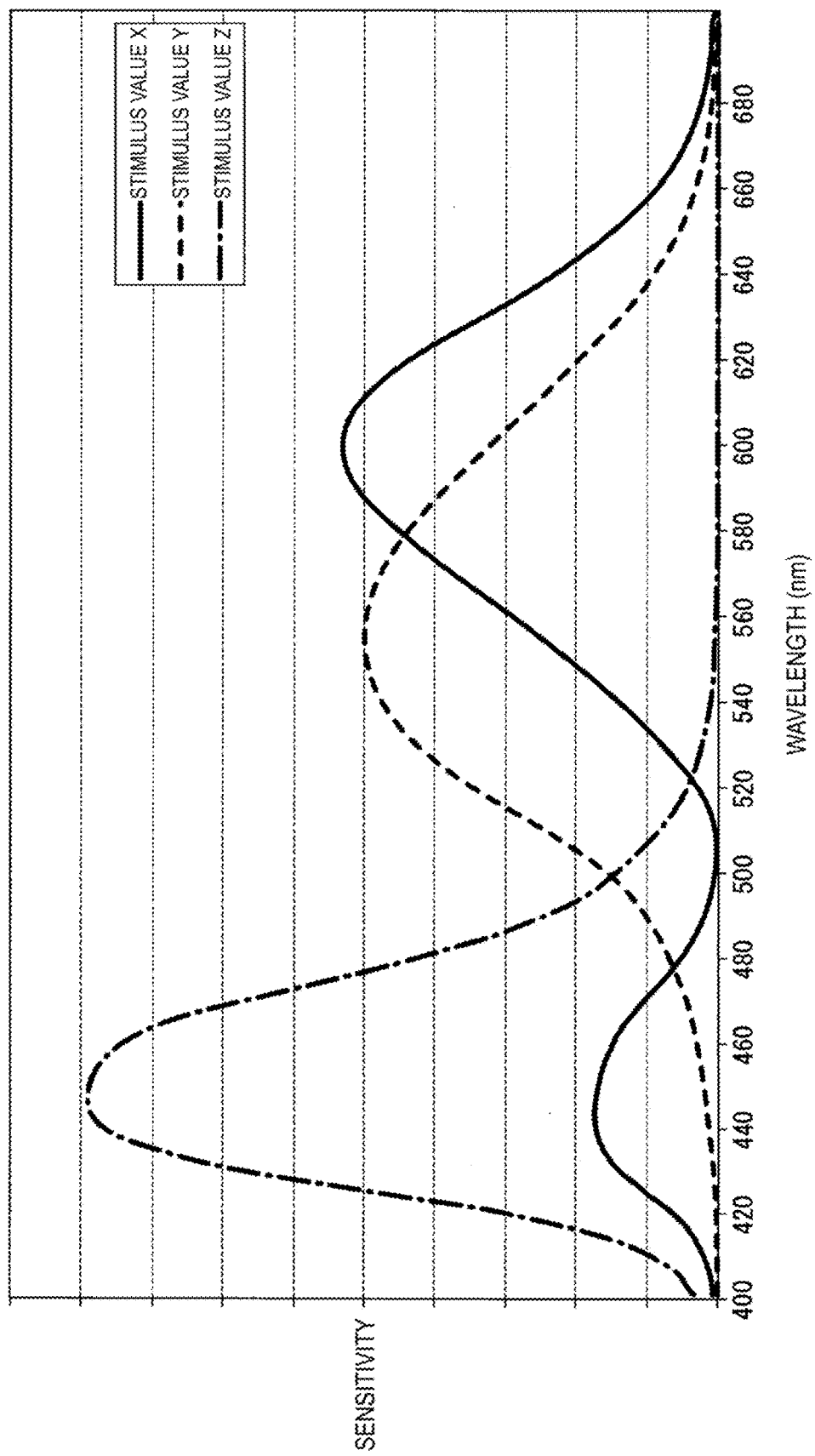
FIG. 13 is a diagram illustrating tristimulus values XYZ.

FIG. 13 is a diagram illustrating the tristimulus values XYZ. In FIG. 13, a horizontal axis indicates wavelength of light, and a vertical axis indicates sensitivity of a visual cell corresponding to each color light. As illustrated in FIG. 13, a wavelength band of light at which maximum sensitivity is obtained in the stimulus value X is near 600 nm. That is, the red visual cell of the eye, since stimulus received from light in a wavelength band near 600 nm is strongest, recognizes bright red from light in the wavelength band near 600 nm. On the other hand, for the red visual cell of the eye, since stimulus received from light in a wavelength band other than near 600 nm lowers, a degree of red recognition also decreases.

Further, a wavelength band of light at which maximum sensitivity is obtained in the stimulus value Y is near 555 nm. That is, the green visual cell of the human eye, since stimulus received from light in the wavelength band near 555 nm is strongest, recognizes bright green from light in the wavelength band near 555 nm. On the other hand, for the green visual cell of the eye, since stimulus received from light in a wavelength band other than near 555 nm lowers, a degree of green recognition also decreases.

Further, a wavelength band of light at which maximum sensitivity is obtained in the stimulus value Z is near 445 nm. That is, the blue visual cell of the human eye, since stimulus received from light in the wavelength band near 450 nm is strongest, recognizes bright blue from light in the wavelength band near 450 nm. On the other hand, for the blue visual cell of the eye, since stimulus received from light in a wavelength band other than near 450 nm lowers, a degree of blue recognition also decreases.

Figure 14:
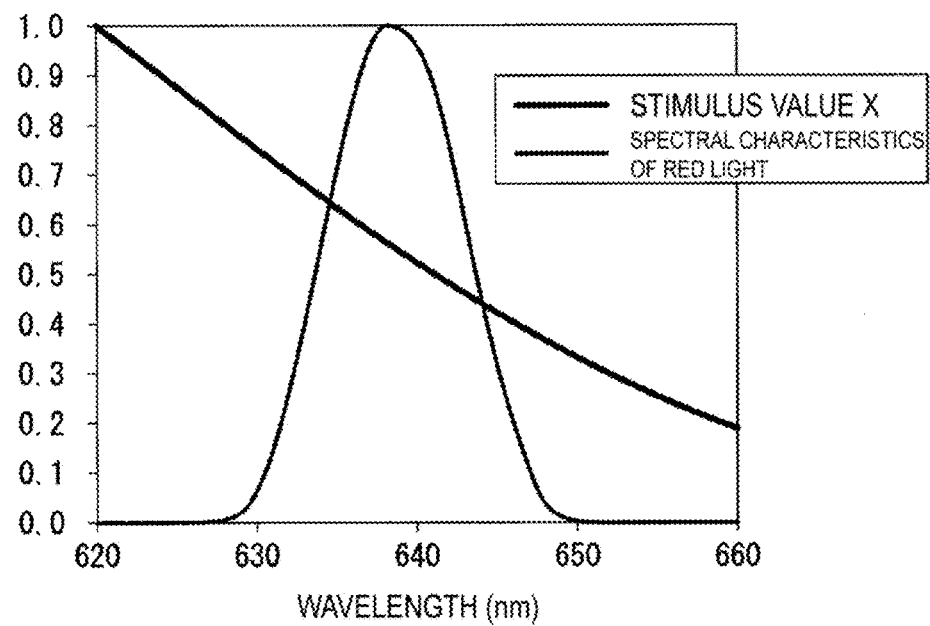
FIG. 14 is a diagram illustrating a relationship between the stimulus value X and spectral characteristics of red light.

First, a relationship between the stimulus value X and the red light LR included in the imaging light L0 will be described. FIG. 14 is a diagram illustrating a relationship between the stimulus value X and spectral characteristics of the red light LR included in the imaging light L0. FIG. 14 illustrates spectral characteristics of the red light LR when the center of the pupil E1 coincides on an optical axis of the imaging light L0. In FIG. 14, a horizontal axis indicates wavelength of light. In FIG. 14, a vertical axis indicates sensitivity of the stimulus value X and normalized value of illuminance of the red light LR. In FIG. 14, a portion of a curve indicating the stimulus value X is illustrated, and illustration of a short wavelength side, not illustrated in the horizontal axis, is omitted.

As illustrated in FIG. 14, a wavelength band of the red light LR (first color light) incident on the pupil E1 of the observer is, for example, from 630 nm to 650 nm. Further, a peak wavelength (second wavelength) of the red light LR is approximately 640 nm. Compared to this, as illustrated in FIG. 13 and FIG. 14, sensitivity in the stimulus value X, that is, a wavelength of light (first wavelength) at which sensitivity of the red visual cell of the eye is maximized is approximately 600 nm. Therefore, the wavelength of light 600 nm at which the sensitivity in the stimulus value X is maximized is on a short wavelength side of the peak wavelength 640 nm of the red light LR.

As illustrated in FIG. 12, an incident position of the red light LR with respect to the pupil E1 of the observer varies for each wavelength band. Thus, for example, when the eye E of the observer moves in the left and right direction, there is a possibility that the wavelength band of the red light LR incident on the pupil E1 of the eye E changes, and color balance (white balance) of an image visible by the observer changes.

In order to cancel the deviation of the white balance described above, the optical system 10 of the present exemplary embodiment is provided with the optical filter 80 (see FIG. 2) disposed between the imaging light generating device 31 and the second diffraction element 70. The optical filter 80 is constituted by, for example, a dielectric multilayer film or the like.

In the present exemplary embodiment, the optical filter 80 is provided between the first diffraction element 50 and the second diffraction element 70 on the light path of the imaging light L0. The imaging light L0 diffracted by the first diffraction element 50 is incident on the second diffraction element 70 in a state of being substantially collimated. Thus, the imaging light L0 is incident on the optical filter 80 in a collimated state. In other words, in the present exemplary embodiment, the optical filter 80 is provided at a position in the light path of the imaging light L0 through which the imaging light L0 passes as a parallel luminous flux. The optical filter 80 is designed so that optical characteristics are improved as an incident angle of the imaging light L0 is smaller, that is, as the incidence is closer to normal incidence. According to the optical system 10 of the present exemplary embodiment, as described above, the optical filter 80 is provided at the position through which the imaging light L0 passes as a parallel luminous flux, and thus, the imaging light L0 can be made normal incident on the optical filter 80. Therefore, according to the optical filter 80 of the present exemplary embodiment, desired optical characteristics can be imparted to the imaging light L0.

Figure 15:
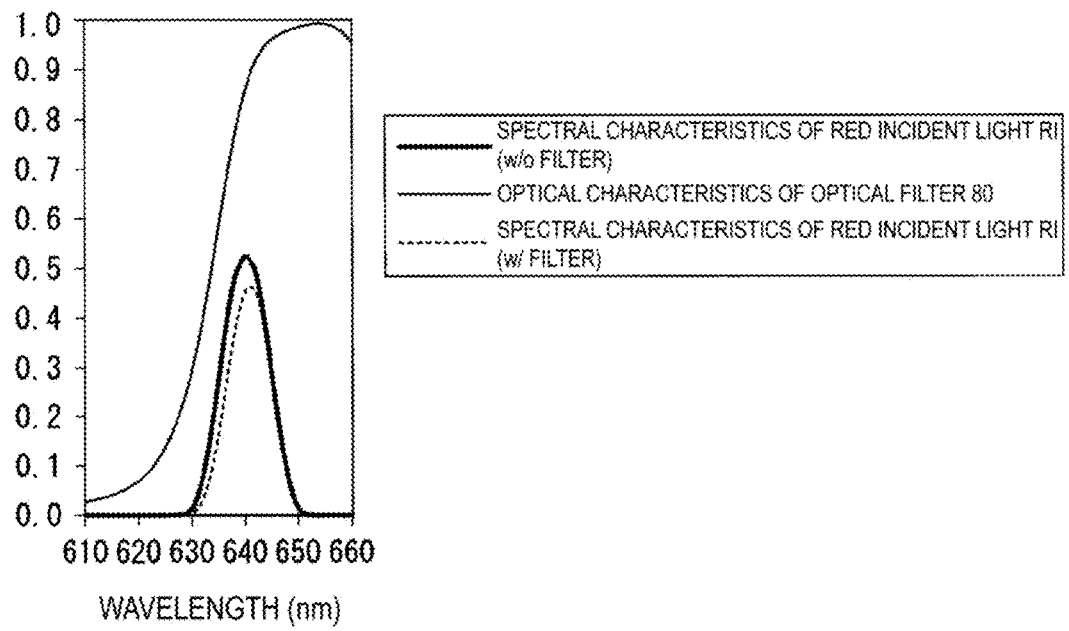
FIG. 15 is a diagram illustrating optical characteristics of an optical filter for the red light.

FIG. 15 is a diagram illustrating optical characteristics of the optical filter 80 for the red light LR. In FIG. 15, spectral characteristics of the red light LR incident on the pupil by passing through the optical filter 80 are illustrated. Hereinafter, the red light LR that passes through the optical filter 80 and enters the pupil is referred to as red incident light RI. A horizontal axis in FIG. 15 indicates wavelength of light incident on the optical filter 80. A vertical axis in FIG. 15 indicates normalized value of each of transmittance of the optical filter 80 and illuminance of the red incident light RI. In FIG. 15, as a comparison, spectral characteristics when the optical filter 80 is not provided are also illustrated.

The spectral characteristics of the red incident light RI illustrated in FIG. 15 correspond to characteristics when the center of the pupil E1 of the eye E of the observer coincides with an optical axis of the optical system 10. That is, the spectral characteristics of the red incident light RI illustrated in FIG. 15 are characteristics when the eye E of the observer is positioned on the optical axis, and does not move in the left and right direction.

As illustrated in FIG. 15, the optical filter 80 has a characteristic that attenuates a band on the short wavelength side of the peak wavelength 640 nm of the red light LR included in the imaging light L0. Therefore, even when the eye E of the observer is positioned on the optical axis, illuminance of a band on a short wavelength side of the red light LR is partially cut by the optical filter 80.

An attenuation force of the optical filter 80 increases as the wavelength of the red light LR shortens. In other words, the optical filter 80, as illustrated in FIG. 15, decreases transmittance of the red light LR as the wavelength of the red light LR shortens.

Here, for example, a case in which the eye E of the observer moves to the nasal side will be described.

Figure 16A:
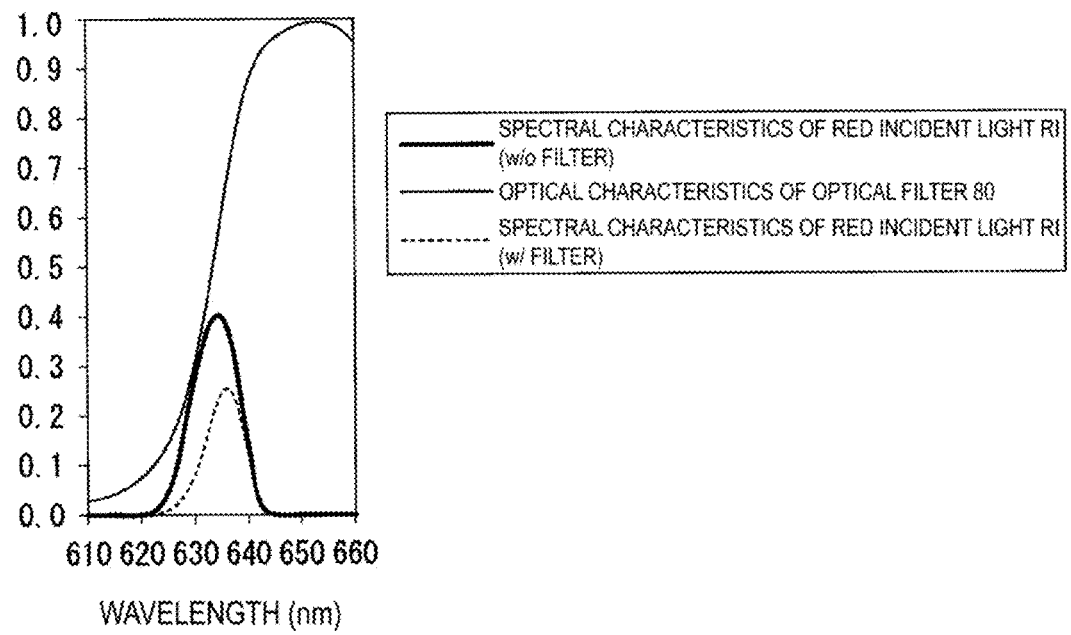
FIG. 16A is a diagram illustrating an effect of the optical filter.

FIG. 16A is a diagram illustrating an effect of the optical filter 80. FIG. 16A illustrates spectral characteristics of the red incident light RI incident on the pupil E1, when the center of the pupil E1 of the eye E of the observer deviates 1.5 mm from the optical axis of the optical system 10 to the nasal side. In FIG. 16A, as a comparison, spectral characteristics when the optical filter 80 is not provided are also illustrated.

When the eye E of the observer deviates 1.5 mm to the nasal side, in the red incident light RI incident on the pupil E1, as illustrated in FIG. 12, a percentage of the short wavelength component LRp1 near 630 nm on the short wavelength side increases compared to a percentage of the long wavelength component LRp2 near 650 nm on the long wavelength side. Thus, as illustrated in FIG. 16A, when the optical filter 80 is not provided, the spectral characteristics of the red incident light RI incident on the eye E of the observer change. Specifically, the spectral characteristics of the red incident light RI shift a peak wavelength band to a low wavelength side.

As illustrated in FIG. 13 and FIG. 14, a peak wavelength 600 nm at which the red visual sensitivity in the eye E of the observer is maximized is on the short wavelength side of the peak wavelength 640 nm of the red light LR. In other words, when the eye E of the observer moves 1.5 mm to the nasal side and a peak wavelength of the red incident light RI shifts to a low wavelength side, the peak wavelength of the red incident light RI approaches a peak wavelength of the red visual sensitivity. Then, the eye E of the observer is brought into a state of further easily recognizing the red incident light RI. The observer recognizes a strong red color from the red incident light RI included in the imaging light L0, and thus color balance (white balance) of an image to be visually recognized deviates closer to red.

Next, a case in which the optical filter 80 is provided will be described.

By passing through the optical filter 80, the short wavelength side of the peak wavelength 640 nm of the red light LR is attenuated. As described above, the optical filter 80 decreases the transmittance of the red light LR as the short wavelength side is approached.

When the eye E of the observer deviates 1.5 mm to the nasal side, as described above, the red incident light RI is to include the short wavelength component LRp1 more than the long wavelength component LRp2, but the short wavelength component LRp1 is attenuated more greatly than the long wavelength component LRp2 by the optical filter 80. Therefore, as illustrated in FIG. 16A, compared to the case in which the optical filter 80 is not provided, movement of the peak wavelength band of the red incident light RI toward the low wavelength side is suppressed, and the illuminance is also decreased.

The optical filter 80, even when the eye E of the observer moves 1.5 mm toward the nasal side, suppresses the peak wavelength of the red incident light RI from approaching the peak wavelength of the red visual sensitivity.

While the peak wavelength of the red incident light RI somewhat approaches the peak wavelength of the red visual sensitivity, the optical filter 80 can reduce the illuminance of the red incident light RI, thereby suppressing stimulus to the red visual cell of the eye E. Thus, even when the eye E of the observer moves 1.5 mm to the nasal side, the visual sensitivity of the red incident light RI included in the imaging light L0 is less likely to change, so it is possible to prevent color balance (white balance) of an image to be visually recognized from deviating closer to red.

On the other hand, a case in which the eye E of the observer moves to the ear side will be described.

Figure 16B:
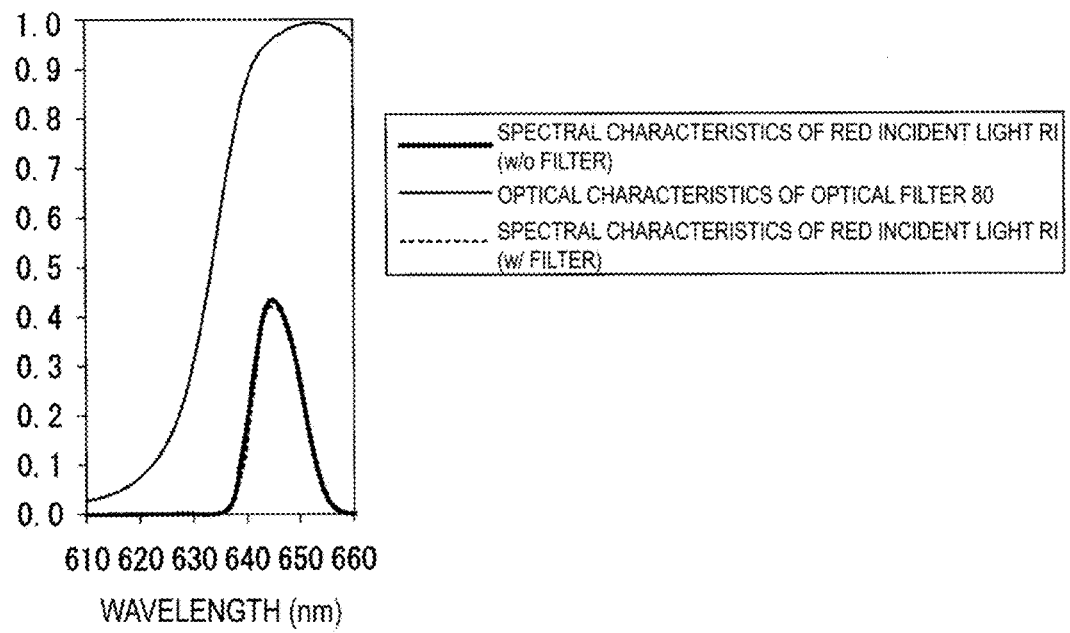
FIG. 16B is a diagram illustrating spectral characteristics of red incident light when the eye moves to an ear side.

FIG. 16B is a diagram illustrating spectral characteristics of the red incident light RI when the eye moves to the ear side. FIG. 16B illustrates spectral characteristics of the red incident light RI incident on the pupil E1, when the center of the pupil E1 of the eye E of the observer deviates 1.5 mm from the optical axis of the optical system 10 to the ear side.

By passing through the optical filter 80, the short wavelength side of the peak wavelength 640 nm of the red light LR is attenuated.

When the eye E of the observer deviates 1.5 mm to the ear side, in the red incident light RI, as illustrated in FIG. 12, the percentage of the short wavelength component LRp1 near 630 nm on the short wavelength side, is decreased compared to the percentage of the long wavelength component LRp2 near 650 nm on the long wavelength side. In other words, the red incident light RI is to include the long wavelength component LRp2 more than the short wavelength component LRp1. In other words, in the red incident light RI, the long wavelength component LRp2 for which a degree of attenuation by the optical filter 80 is small increases compared to the short wavelength component LRp1 for which the degree of attenuation by the optical filter 80 is large. That is, the spectral characteristics of the red incident light RI shift the peak wavelength band to the long wavelength side.

When the peak wavelength of the red incident light RI shifts to the long wavelength side, the peak wavelength of the red incident light RI is to be separated from the peak wavelength of the red visual sensitivity. When the peak wavelength of the red incident light RI is separated from the peak wavelength of the red visual sensitivity, the eye E of the observer is brought into a state of being difficult to recognize the red incident light RI.

Compared to this, the optical filter 80 of the present exemplary embodiment has a characteristic that does not attenuate the long wavelength component LRp2 of the red light LR emitted from the image display device 11, thus the illuminance of the red incident light RI when the eye E deviates 1.5 mm to the ear side is higher than that when the eye E deviates 1.5 mm to the nasal side. Thus, the eye E of the observer can maintain a state of easily recognizing the red incident light RI.

Thus, even when the observer moves the eye E 1.5 mm to the ear side, an amount of stimulus that the red incident light RI gives to the red visual cell does not change as a whole. That is, when the eye E of the observer moves 1.5 mm to the ear side, color balance (white balance) of an image visible by the observer does not change.

According to the optical filter 80 of the present exemplary embodiment, as illustrated in FIG. 16B, an effect of the optical filter 80 obtained when the eye E of the observer deviates to the ear side is small compared to a case in which the eye E deviates to the nasal side, but deviation of color balance (white balance) of an image due to the red light LR can be suppressed.

According to the optical filter 80 of the present exemplary embodiment, even when the eye E of the observer moves 1.5 mm to the nasal side or the ear side, deviation of color balance (white balance) of an image by the red light LR can be suppressed.

Figure 17:
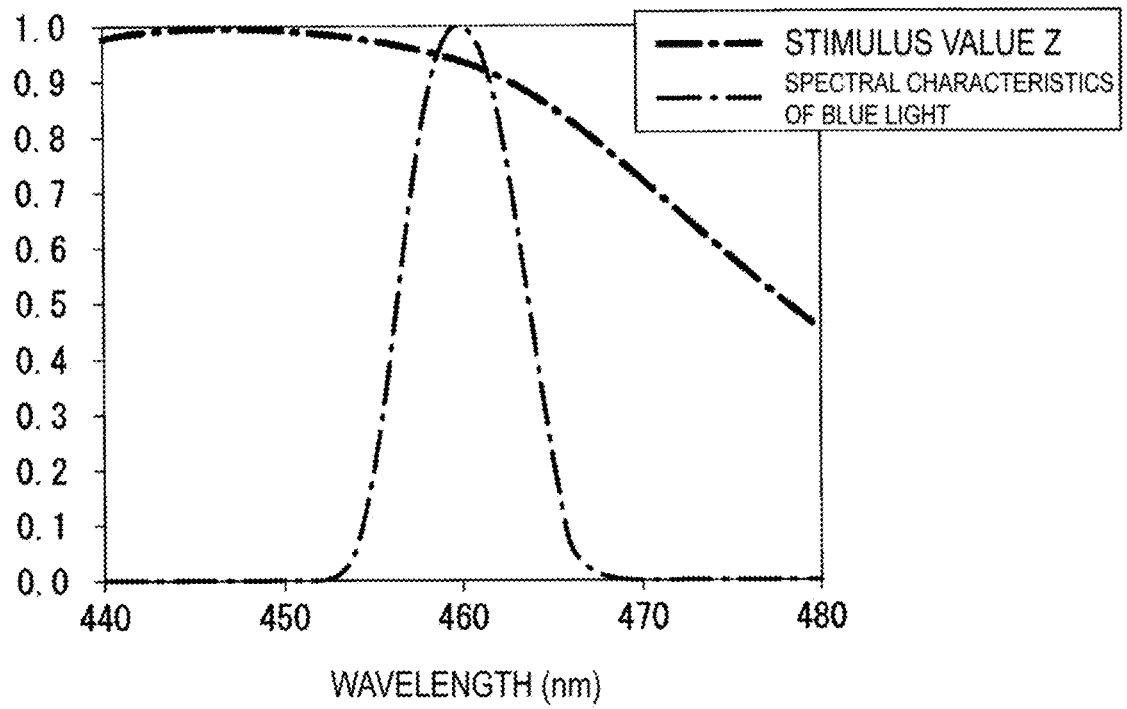
FIG. 17 is a diagram illustrating a relationship between the stimulus value Z and spectral characteristics of blue light.

Next, a relationship between the optical filter 80 and the other color light included in the imaging light L0 will be described. First, a relationship between the stimulus value Z and the blue light LB included in the imaging light L0 will be described. FIG. 17 is a diagram illustrating a relationship between the stimulus value Z and spectral characteristics of the blue light LB included in the imaging light L0. FIG. 17 illustrates spectral characteristics of the blue light LB when the center of the pupil E1 coincides on the optical axis of the imaging light L0. In FIG. 17, a horizontal axis indicates wavelength of light. In FIG. 17, a vertical axis indicates sensitivity of the stimulus value Z and normalized value of illuminance of the blue light LB. In FIG. 17, a portion of a curve indicating the stimulus value Z is illustrated, and illustration of a short wavelength side, not illustrated in the horizontal axis, is omitted.

As illustrated in FIG. 17, a wavelength band of the blue light (first color light) LB incident on the pupil E1 of the observer is, for example, from 453 nm to 468 nm. Further, a peak wavelength (second wavelength) of the blue light LB is approximately 460 nm. Compared to this, as illustrated in FIG. 13 and FIG. 17, the sensitivity in the stimulus value Z, that is, a wavelength of light (first wavelength) at which sensitivity of the blue visual cell of the eye is maximized is approximately 450 nm. In other words, the wavelength of the light 450 nm at which the maximum sensitivity in the stimulus value Z is obtained is on a short wavelength side of the peak wavelength 460 nm of the blue light LB.

As illustrated in FIG. 12, an incident position of the blue light LB with respect to the pupil E1 of the observer varies for each wavelength band. Thus, for example, when the eye E of the observer moves in the left and right direction, there is a possibility that a wavelength band of the blue light LB incident on the pupil E1 changes, and color balance (white balance) of an image visible by the observer changes. In the optical system 10 of the present exemplary embodiment, a change in color balance (white balance) can be suppressed by the optical filter 80.

Figure 18:
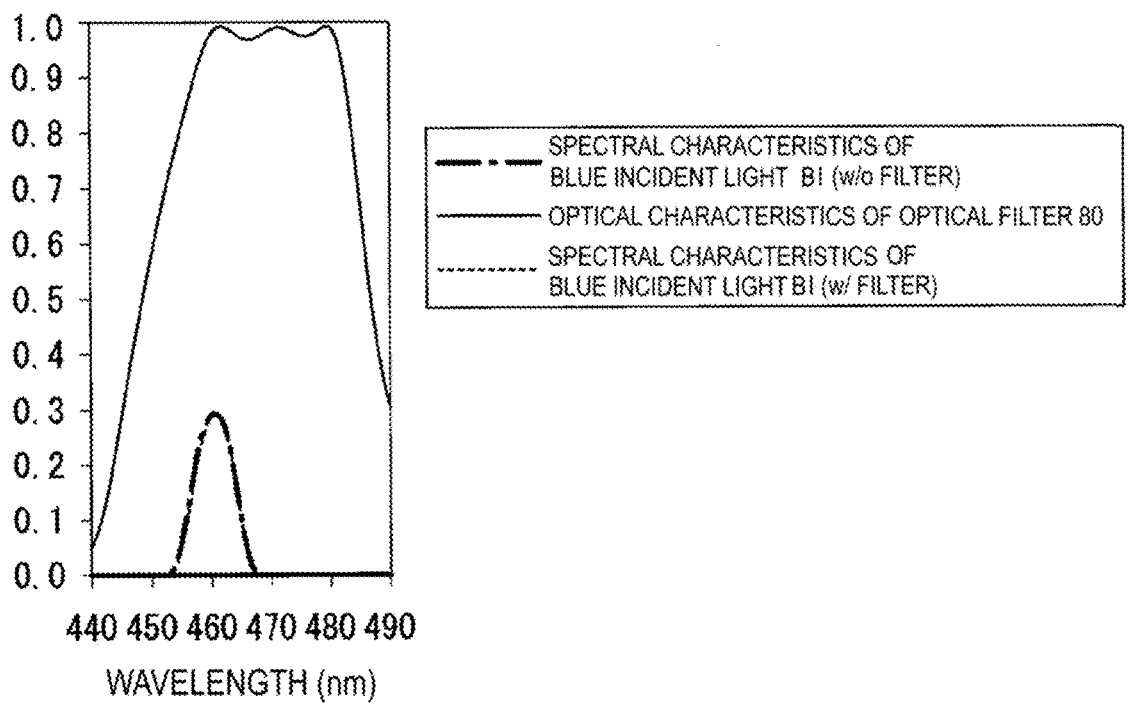
FIG. 18 is a diagram illustrating optical characteristics of the optical filter for the blue light.

FIG. 18 is a diagram illustrating optical characteristics of the optical filter 80 for the blue light LB. In FIG. 18, spectral characteristics of blue light LB incident on the pupil by passing through the optical filter 80 are illustrated. Hereinafter, the blue light LB that passes through the optical filter 80 and enters the pupil is referred to as blue incident light BI. A horizontal axis in FIG. 18 indicates wavelength of light incident on the optical filter 80. A vertical axis in FIG. 18 indicates normalized value of each of transmittance of the optical filter 80 and illuminance of the blue incident light BI. In FIG. 18, as a comparison, spectral characteristics when the optical filter 80 is not provided are also illustrated.

The spectral characteristics of the blue incident light BI illustrated in FIG. 18 are characteristics when the center of the pupil E1 of the eye E of the observer coincides with the optical axis of the optical system 10. That is, the spectral characteristics of the blue incident light BI illustrated in FIG. 18 are characteristics when the eye E of the observer is positioned on the optical axis, and does not move in the left and right direction.

As illustrated in FIG. 18, the optical filter 80 has a characteristic that attenuates a band on the short wavelength side of the peak wavelength 460 nm of the blue light LB included in the imaging light L0. Therefore, even when the eye E of the observer is positioned on the optical axis, illuminance of a band on a short wavelength side of the blue light LB is partially cut by the optical filter 80.

An attenuation force of the optical filter 80 increases as the wavelength of the blue light LB shortens. In other words, the optical filter 80, as illustrated in FIG. 18, decreases transmittance of the blue light LB as the wavelength of the blue light LB shortens.

Here, for example, a case in which the eye E of the observer moves to the nasal side will be described.

Figure 19A:
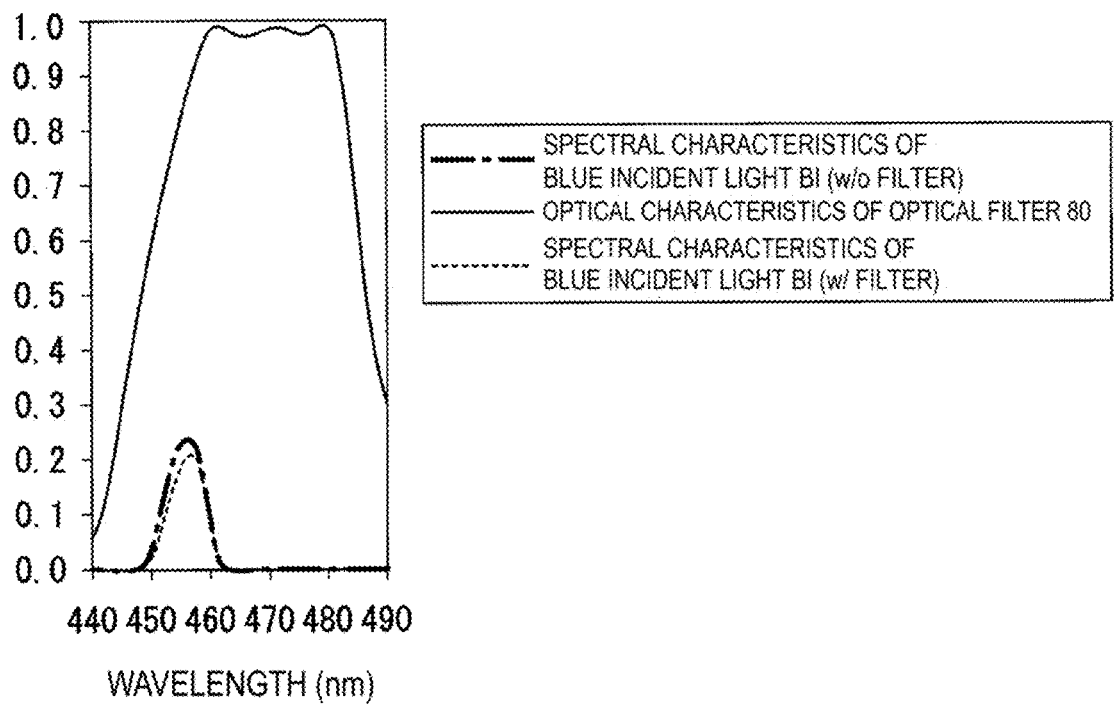
FIG. 19A is a diagram illustrating an effect of the optical filter.

FIG. 19A is a diagram illustrating an effect of the optical filter 80. FIG. 19A illustrates spectral characteristics of the blue incident light BI incident on the pupil E1, when the center of the pupil E1 of the eye E of the observer deviates 1.5 mm from the optical axis of the optical system 10 to the nasal side. In FIG. 19A, as a comparison, spectral characteristics when the optical filter 80 is not provided are also illustrated.

When the eye E of the observer deviates 1.5 mm to the nasal side, in the blue incident light BI incident on the pupil E1, as illustrated in FIG. 12, a percentage of the short wavelength component LBp1 increases compared to a percentage of the long wavelength component LBp2. Thus, as illustrated in FIG. 19A, when the optical filter 80 is not provided, the spectral characteristics of the blue incident light BI incident on the eye E of the observer shift the peak wavelength to a low wavelength side.

As illustrated in FIG. 13 and FIG. 17, the peak wavelength 450 nm at which the blue visual sensitivity in the eye E of the observer is maximized is on the short wavelength side of the peak wavelength 460 nm of the blue light LB. In other words, when the eye E of the observer moves 1.5 mm to the nasal side and the peak wavelength of the blue incident light BI shifts to the low wavelength side, the peak wavelength of the blue incident light BI approaches the peak wavelength of the blue visual sensitivity. Then, the eye E of the observer is brought into a state of further easily recognizing the blue incident light BI. The observer recognizes a strong blue color from the blue incident light BI included in the imaging light L0, and thus color balance (white balance) of an image to be visually recognized deviates closer to blue.

On the other hand, when the optical filter 80 is provided, by passing through the optical filter 80, the short wavelength side of the peak wavelength 460 nm of the blue light LB is attenuated. As described above, the optical filter 80 decreases the transmittance of the blue light LR as the short wavelength side is approached.

When the eye E of the observer deviates 1.5 mm to the nasal side, as described above, the blue incident light BI is to include the short wavelength component LBp1 more than the long wavelength component LBp2, but the short wavelength component LBp1 is attenuated more greatly than the long wavelength component LBp2 by the optical filter 80. Therefore, as illustrated in FIG. 19A, compared to the case in which the optical filter 80 is not provided, movement of the peak wavelength band of the blue incident light BI toward the low wavelength side is suppressed, and the illuminance is also decreased.

The optical filter 80, even when the eye E of the observer moves 1.5 mm toward the nasal side, suppresses the peak wavelength of the blue incident light BI from approaching the peak wavelength of the blue visual sensitivity.

While the peak wavelength of the blue incident light BI somewhat approaches the peak wavelength of the blue visual sensitivity, the optical filter 80 can reduce the illuminance of the blue incident light BI, thereby suppressing stimulus to the blue visual cell of the eye E. Thus, even when the eye E of the observer moves 1.5 mm to the nasal side, the blue incident light BI included in the imaging light L0 is less likely to change, so it is possible to prevent color balance (white balance) of an image to be visually recognized from deviating closer to blue.

On the other hand, a case in which the eye E of the observer moves to the ear side will be described.

Figure 19B:
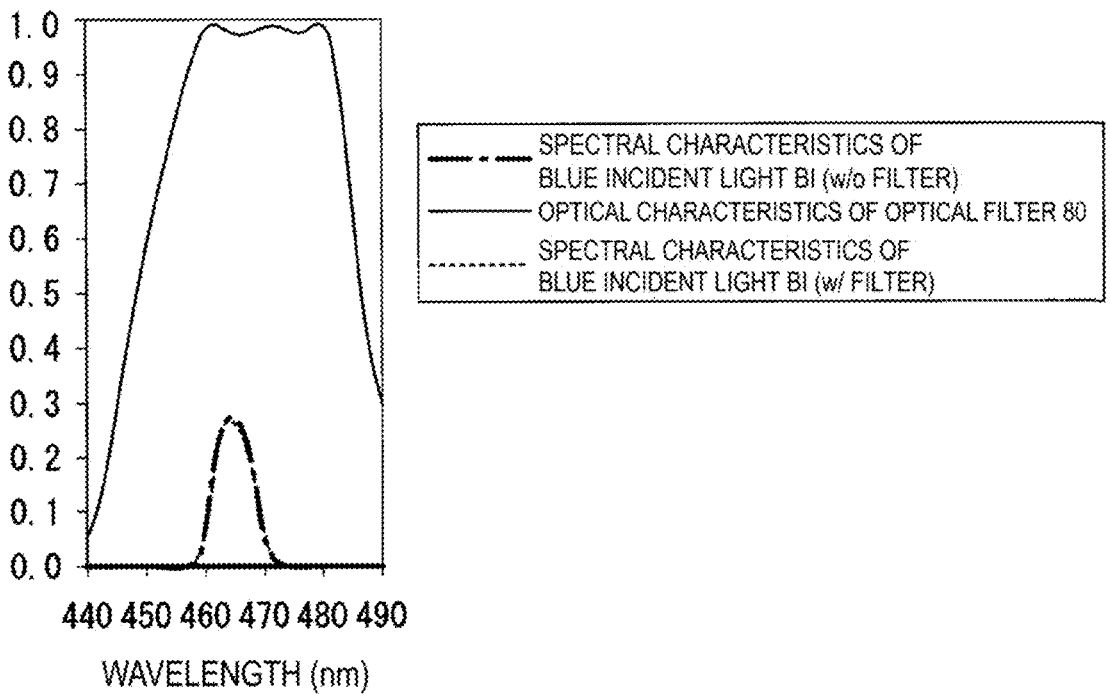
FIG. 19B is a diagram illustrating spectral characteristics of blue incident light when the eye moves to the ear side.

FIG. 19B is a diagram illustrating spectral characteristics of the blue incident light BI when the eye moves to the ear side. FIG. 19B illustrates spectral characteristics of the blue incident light BI incident on the pupil E1, when the center of the pupil E1 of the eye E of the observer deviates 1.5 mm from the optical axis of the optical system 10 to the ear side.

By passing through the optical filter 80, the short wavelength side of the peak wavelength 460 nm of the blue light LB is attenuated.

When the eye E of the observer deviates 1.5 mm to the ear side, the blue incident light BI is to include the long wavelength component LBp2 more than the short wavelength component LBp1 as illustrated in FIG. 12. In other words, in the blue incident light BI, the long wavelength component LBp2 for which a degree of attenuation by the optical filter 80 is small increases compared to the short wavelength component LBp1 for which the degree of attenuation by the optical filter 80 is large. Thus, the spectral characteristics of the blue incident light BI shift the peak wavelength band to the long wavelength side.

When the peak wavelength of the blue incident light BI shifts to the long wavelength side, the peak wavelength of the blue incident light BI is separated from the peak wavelength of the blue visual sensitivity. When the peak wavelength of the blue incident light BI is separated from the peak wavelength of the blue visual sensitivity, the eye E of the observer is brought into a state of being difficult to recognize the blue incident light BI. Compared to this, the optical filter 80 of the present exemplary embodiment has a characteristic that does not attenuate the long wavelength component LBp2 of the blue light LB emitted from the image display device 11, thus the illuminance of the blue incident light BI when the eye E deviates 1.5 mm to the ear side can be made higher than that when the eye E deviates 1.5 mm to the nasal side. Thus, the eye E of the observer is brought into a state of easily recognizing the blue incident light BI.

Thus, although an effect of the optical filter 80 obtained when the eye E of the observer deviates to the ear side is smaller compared to the case in which the eye E deviates to the nasal side, but an amount of stimulus that the blue incident light BI gives to the blue visual cell does not change as a whole. That is, when the eye E of the observer moves 1.5 mm to the ear side, color balance (white balance) of an image visible by the observer does not change.

As described above, according to the optical filter 80 of the present exemplary embodiment, even when the eye E of the observer moves to the ear side, deviation of color balance (white balance) of an image due to the blue light LB can be suppressed.

Figure 20:
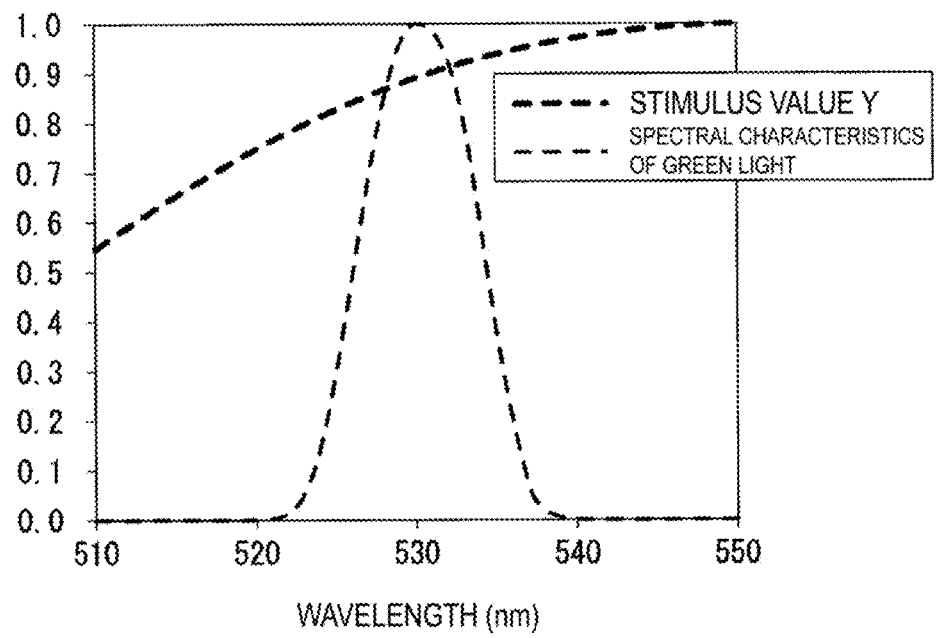
FIG. 20 is a diagram illustrating a relationship between the stimulus value Y and spectral characteristics of green light.

Next, a relationship between the stimulus value Y and the green light LG included in the imaging light L0 will be described. FIG. 20 is a diagram illustrating a relationship between the stimulus value Y and spectral characteristics of the green light LB included in the imaging light L0. FIG. 20 illustrates spectral characteristics of the green light LG when the center of the pupil E1 coincides on the optical axis of the imaging light L0. In FIG. 20, a horizontal axis indicates wavelength of light. In FIG. 20, a vertical axis indicates sensitivity of the stimulus value Y and normalized value of illuminance of the green light LG. In FIG. 20, a portion of a curve indicating the stimulus value Y is illustrated, and illustration of a short wavelength side, not illustrated in the horizontal axis, is omitted.

As illustrated in FIG. 20, a peak wavelength of the green light LG incident on the pupil E1 of the observer is approximately 530 nm. Compared to this, as illustrated in FIG. 13 and FIG. 20, sensitivity in the stimulus value Y, that is, a wavelength of light at which sensitivity of the green visual cell of the eye is maximized is approximately 555 nm. In other words, the wavelength of the light 555 nm at which the maximum sensitivity in the stimulus value Y is obtained is on a long wavelength side of the peak wavelength 530 nm of the green light LG.

As illustrated in FIG. 12, an incident position of the green light LG with respect to the pupil E1 of the observer varies for each wavelength band. Thus, for example, when the eye E of the observer moves in the left and right direction, a wavelength band of the green light LG incident on the pupil E1 changes.

Here, an amount of change in visual sensitivity that occurs when the eye E moves depends on magnitude of an inclination of each curve defining the stimulus values XYZ. For example, as illustrated in FIG. 13, the inclination of the curve that indicates the stimulus value Y is smaller than the inclination of the curve defining the stimulus value X. Therefore, an amount of change in the green visual sensitivity generated along with movement of the eye E becomes smaller compared to the red visual sensitivity.

It is known that, when determining a relative luminance difference between different colors, a human eye feels green light more intensely than red light or blue light of the same intensity. That is, the green light is a color light that contributes most to brightness of imaging light. Thus, for example, when an amount of light of the green light LG is changed when white balance is adjusted, brightness of the imaging light L0 changes greatly.

The optical filter 80 of the present exemplary embodiment has a characteristic that does not attenuate a band of the green light LG that greatly affects the brightness of the imaging light L0. According to the optical filter 80 of the present exemplary embodiment, a loss of an amount of light of the imaging light L0 can be reduced by not attenuating the green light LG. Thus, the observer can be caused to visually recognize the bright light imaging light L0.

As described above, according to the optical system 10 of the present exemplary embodiment, the optical filter 80 is provided that attenuates the band on the short wavelength side of the peak wavelength of the red light LR for which a change in the stimulus value is large, thus even when the eye E of the observer moves, for example, 1.5 mm, to the nasal side or the ear side, a change in the red visual sensitivity can be suppressed, and thus deviation of color balance (white balance) of an image can be suppressed. In addition, since the optical filter 80 of the present exemplary embodiment has a characteristic that also attenuates a band on a short wavelength side of the peak wavelength of the blue light LB, even when the eye E of the observer moves, for example 1.5 mm, to the nasal side or the ear side, a change in the blue visual sensitivity can be suppressed, thereby further reducing deviation of color balance (white balance) of an image.

In addition, according to the optical system 10 of the present exemplary embodiment, a fact could be confirmed that in a case in which a color difference in white light when the eye E of the observer deviates ±1.5 mm in the left and right direction is represented in the u'v' chromaticity diagram, a color difference Δu'v' can be reduced from 0.04 to 0.004.

Second Exemplary Embodiment

Next, an optical system according to a second exemplary embodiment will be described. The optical system of the present exemplary embodiment differs greatly in terms of using a light guide instead of four optical units. Note that, a member common to the first exemplary embodiment will be given an identical reference numeral and detail description will be omitted.

Figure 21:
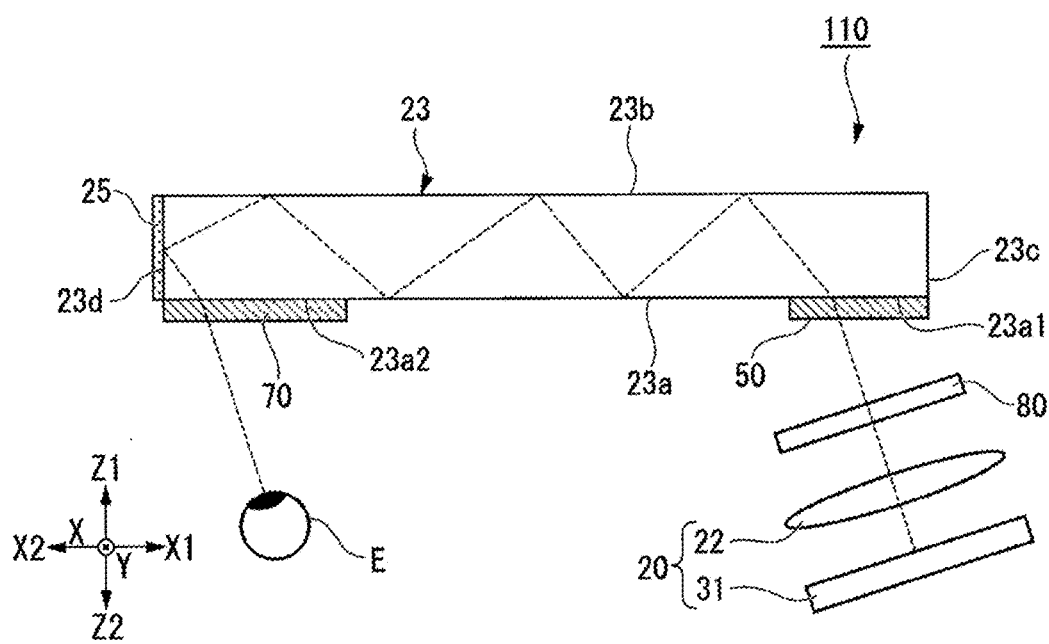
FIG. 21 is a cross-sectional view illustrating a configuration of main portions of an optical system according to a second exemplary embodiment.

FIG. 21 is a cross-sectional view illustrating a configuration of main portions of the optical system according to the present exemplary embodiment. FIG. 21 is the cross-sectional view of the main portions illustrating an example of internal structure of a right-eye optical system and a light guide according to the present exemplary embodiment.

As illustrated in FIG. 21, an optical system 110 of the present exemplary embodiment includes an image forming unit 20, a light guide 23, a reflective layer 25, the first diffraction element 50, the second diffraction element 70, and the optical filter 80.

The image forming unit 20 includes an image display unit 21 and a projection optical system 22. The image display unit 21 is constituted by the imaging light generating device 31. The projection optical system 22 is a collimating lens that converts the imaging light L0 emitted from the image display device 11 into light flux in a collimated state so as to be incident on the light guide 23.

In the present exemplary embodiment, the optical filter 80 is provided between the projection optical system 22 and the first diffraction element 50. In other words, the imaging light L0 is incident on the optical filter 80 in a collimated state. Thus, the optical filter 80 can efficiently attenuate a predetermined wavelength band of each color light of the incident imaging light L0.

The light guide 23 is formed by a tabular member. The light guide 23 is a plate-like member formed from an optical transparent resin material or the like, and includes a first surface 23a opposing to the image forming unit 20, a second surface 23b facing in an opposite direction to the first surface 23a, a third surface 23c coupling end portions on the right side X1 that is one side of the respective first surface 23a and second surface 23b, and a fourth surface 23d coupling end portions on the left side X2 that is another side of the respective first surface 23a and second surface 23b. The reflective layer 25 is provided on the fourth surface 23d.

Specifically, the light guide 23 includes a light incident surface 23a1, which is a light incident part that captures imaging light from the image forming unit 20, and a light emitting surface 23a2 that emits imaging light toward the eye E of the observer. The light incident surface 23a1 is provided at the end portion on the right side X1 of the first surface 23a. The first diffraction element 50 is provided on the light incident surface 23a1. The light emitting surface 23a2 is provided at the end portion on the left side X2 of the first surface 23a. The second diffraction element 70 is provided on the light emitting surface 23a2.

In the optical system 110 of the present exemplary embodiment, the imaging light L0 diffracted by the first diffraction element 50 on an incident side is totally reflected by the reflective layer 25 disposed at a waveguide end portion on a side of the second diffraction element 70 and guides the imaging light L0 to the eye of the observer.

More specifically, the imaging light L0 diffracted by the first diffraction element 50 is first incident on and totally reflected by the second surface 23b, and is then incident on and totally reflected by the first surface 23a. By repeating this action, the imaging light L0 is guided to the reflective layer 25 provided at another end (the nasal side of the observer) of the light guide 23. Then, the imaging light L0 reflected by the reflective layer 25 is diffracted by the second diffraction element 70 on the light emitting surface 23a2, and is then emitted toward the eye E.

In the optical system 110 of the present exemplary embodiment as well, the imaging light L0 emitted from the second diffraction element 70 is, as illustrated in FIG. 12, separated into each wavelength band and incident on the pupil E1 of the eye E of the observer in a state of substantially collimated. Therefore, when the eye E of the observer deviates in the left and right direction, there is a possibility that a similar problem to that in the configuration such as the optical system in the first exemplary embodiment adopting four optical units may occur, in which a wavelength band of the imaging light L0 incident on the pupil E1 changes, and color balance (white balance) of an image visible by the observer changes.

According to the optical system 110 of the present exemplary embodiment, the optical filter 80 described above is provided, so it is possible to suppress changes in the color balance when the eye E of the observer deviates in the left and right direction.

Hereinbefore, the exemplary embodiment according to the display device of the present disclosure is described, but the present disclosure is not limited to the above exemplary embodiment, and is appropriately changeable without departing from the gist of the disclosure.

For example, in the exemplary embodiment described above, the example is given of the case in which the optical filter 80 is disposed at the position through which the imaging light L0 passes as a parallel luminous flux, a position at which the optical filter 80 is disposed is not limited thereto. The optical filter 80 may be disposed at any position as long as the position is between the imaging light generating device 31 and the exit pupil formed by the second diffraction element 70.

The optical filter 80 may be provided directly on a surface of the second diffraction element 70. For example, when the display device 100 includes a glasses member or lens holder disposed between the second diffraction element 70 and the exit pupil (pupil E1 of eye E), the optical filter 80 may be disposed on a lens of the glasses member or the lens holder.

Additionally, the optical filter 80 may be formed integrally with the projection optical system 32. For example, a dielectric multilayer film formed at a surface of one of the first lens 301, the second lens 302, the third lens 303, and the fourth lens 304 may be used as an optical filter. In this way, the number of parts can be reduced.

In addition, a cover member that covers the second optical unit L20 and the third optical unit L30 may be provided. In this case, the optical filter 80 may be integrally formed with the cover member. In this way, reduction in assembly tolerance can be achieved by integrating the optical filter 80 and the cover member.

In addition, in the exemplary embodiment described above, the example is given of the transmissive-type one as the optical filter 80, but a reflection type one may be used as the optical filter 80. When a reflection type optical filter is used, the filter may be formed integrally with the mirror 40.

In the exemplary embodiment described above, the optical filter 80 corresponding to both the blue light LB and the red light LR is used as the example, but a filter having a characteristic corresponding to the blue light LB and a filter having a characteristic corresponding to the red light LR may be combined to constitute the optical filter 80.

In addition, the case is used as the example in which the optical filter 80 of the above-described exemplary embodiment does not attenuate a band of green light LG that greatly affects the brightness of the imaging light L0, but the present disclosure is not limited thereto. For example, in a special case requiring strict color reproduction rather than brightness of an image, the green light LG may be attenuated.

The peak wavelength (second wavelength) of the green light (first color light) LG incident on the pupil E1 of the observer is approximately 530 nm. Compared to this, as illustrated in FIG. 13 and FIG. 20, the sensitivity in the stimulus value Z, that is, the wavelength of light (first wavelength) at which the sensitivity of the green visual cell of the eye is maximized is approximately 555 nm. In other words, the wavelength of the light 555 nm at which the maximum sensitivity in the stimulus value Y is obtained is longer than the peak wavelength 530 nm of the green light LB.

Thus, when the eye E of the observer moves to the ear side and the peak wavelength of the green incident light GI shifts to the long wavelength side, the peak wavelength of the green incident light GI approaches the peak wavelength of the green visual sensitivity. Then, the eye E of the observer is brought into a state of further easily recognizing the green incident light GI. Since the observer recognizes a strong green color from the green incident light GI included in the imaging light L0, color balance (white balance) of an image to be visually recognized slightly deviates closer to green.

In this case, an optical filter having a characteristic that attenuates a band on a long wavelength side of the peak wavelength 530 nm of the green light LG included in the imaging light L0 may be used. An attenuation force of the optical filter increases as the wavelength of the green light LG elongates. In other words, the optical filter decreases transmittance of the green light LB as the wavelength of the green light LB elongates.

By using such an optical filter, even when the eye E of the observer moves 1.5 mm to the ear side, the peak wavelength of the green incident light BI can be suppressed from approaching the peak wavelength of the green visual sensitivity.

Thus, even when the observer moves the eye E to the ear side, the green incident light GI included in the imaging light L0 is less likely to change, so it is possible to prevent color balance (white balance) of an image to be visually recognized from deviating closer to green.

Note that, in the optical system 110 of the present exemplary embodiment, the configuration is used as the example in which the imaging light L0 reflected by the reflective layer 25 is diffracted by the second diffraction element 70 of the light emitting surface 23a2 and emitted toward the eye E, but the reflective layer 25 may be omitted. In this case, a configuration may be adopted in which the imaging light L0 diffracted by the first diffraction element 50 is propagated by total reflection in the light guide 23 and directly incident on the second diffraction element 70 of the light emitting surface 23a2.

Modification Example

Figure 22:
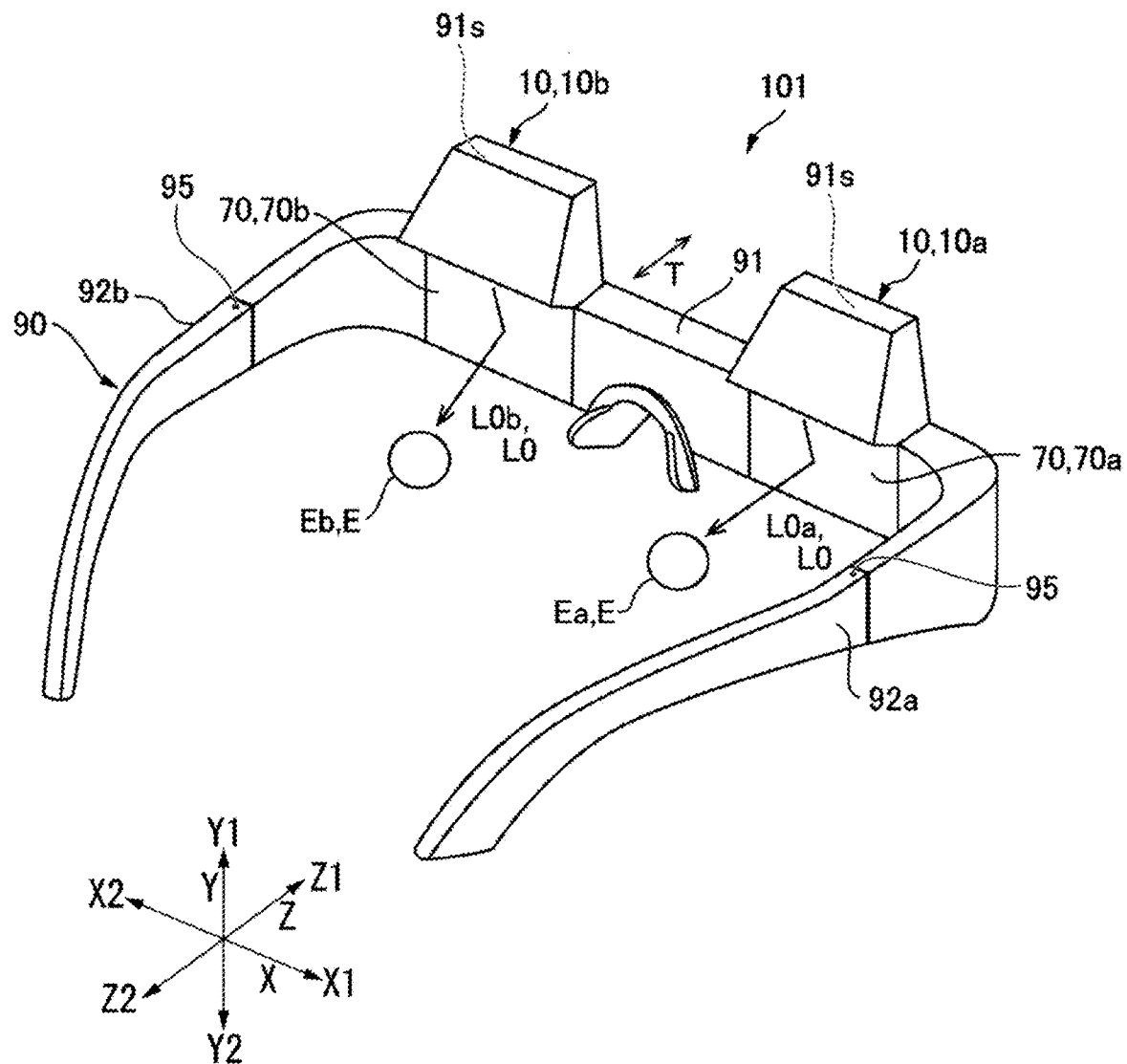
FIG. 22 is a configuration diagram of a display device according to a modification example.

FIG. 22 is a configuration diagram of a display device 101 according to a modification example. As illustrated in FIG. 22, the display device 101 in the modification example includes a right-eye optical system 10a that causes imaging light L0a to be incident on the right eye Ea, a left-eye optical system 10b that causes imaging light L0b to be incident on the left eye Eb, and the housing 90 that holds the right-eye optical system 10a and the left-eye optical system 10b.

The display device 101 in the present modification example has a configuration in which the imaging light L0 travels from the up side Y1 to the down side Y2 in the right-eye optical system 10a and the left-eye optical system 10b, and is thus emitted to the eye E of an observer.

The display device 101 in the present modification example also includes the above-described optical system 10. Thus, the display device 101 in the present modification example can also achieve the size reduction of the device while appropriately performing wavelength compensation by two diffraction elements.

Application to Other Display Device

In the exemplary embodiments described above, the head-mounted display device 100 is exemplified, but the present disclosure may be applied to a head-up display, a handheld display, a projector optical system, and the like.

What is claimed is:

1. A display device, comprising:
an imaging light generating device configured to emit imaging light;
a first diffraction element configured to diffract the imaging light emitted from the imaging light generating device;
a second diffraction element configured to diffract the imaging light diffracted by the first diffraction element to form an exit pupil; and
an optical filter disposed between the imaging light generating device and the exit pupil, and configured to attenuate a band on a short wavelength side of a peak wavelength of red light included in the imaging light emitted from the imaging light generating device,
wherein the optical filter provides a greater attenuation force as a wavelength of the red light becomes shorter.

2. The display device according to claim 1, wherein the optical filter is provided at a position on a light path of the imaging light through which the imaging light passes as a parallel luminous flux.

3. The image display device according claim 1, further comprising along a light path of imaging light emitted from the imaging light generating device:
a first optical unit having positive power;
a second optical unit including the first diffraction element and having positive power;
a third optical unit having positive power; and
a fourth optical unit including the second diffraction element and having positive power.

4. The display device according to claim 1, further comprising a light guide on which the imaging light emitted from the first diffraction element is incident, wherein the second diffraction element emits the imaging light propagating within the light guide.

5. A display device, comprising:
an imaging light generating device configured to emit imaging light;
a first diffraction element configured to diffract the imaging light emitted from the imaging light generating device;
a second diffraction element configured to diffract the imaging light diffracted by the first diffraction element to form an exit pupil; and
an optical filter disposed between the imaging light generating device and the exit pupil, wherein
when a wavelength, at which sensitivity of a visual cell of an eye for first color light included in the imaging light emitted from the imaging light generating device is maximized, is a first wavelength, and a peak wavelength of the first color light included in the imaging light is a second wavelength,
the optical filter attenuates a band on a short wavelength side of the second wavelength of the first color light when the first wavelength is shorter than the second wavelength, and
attenuates a band on a long wavelength side of the second wavelength of the first color light when the first wavelength is longer than the second wavelength.

6. The display device according to claim 5, wherein the optical filter provides a greater attenuation force as a wavelength of the first color light becomes shorter when the first wavelength is shorter than the second wavelength, and
provides a greater attenuation force as the wavelength of the first color light becomes longer when the first wavelength is longer than the second wavelength.

7. The display device according to claim 5, wherein the first color light is red light.

8. A display device, comprising:
an imaging light generating device configured to emit imaging light;
a first diffraction element configured to diffract the imaging light emitted from the imaging light generating device;
a second diffraction element configured to diffract the imaging light diffracted by the first diffraction element to form an exit pupil;
an optical filter disposed between the imaging light generating device and the exit pupil, and configured to attenuate a band on a short wavelength side of a peak wavelength of red light included in the imaging light emitted from the imaging light generating device; and
a light guide on which the imaging light emitted from the first diffraction element is incident, wherein
the second diffraction element emits the imaging light propagating within the light guide.

* * * * *